United States Patent
Fukunaga et al.

(10) Patent No.: US 9,991,503 B2
(45) Date of Patent: Jun. 5, 2018

(54) METHOD FOR PRODUCING NON-AQUEOUS ELECTROLYTE SECONDARY BATTERY

(71) Applicant: ELIIY Power Co., Ltd., Tokyo (JP)

(72) Inventors: Takao Fukunaga, Tokyo (JP); Tomitaro Hara, Tokyo (JP); Yusuke Kazushima, Tokyo (JP)

(73) Assignee: ELIIY POWER CO., LTD., Tokyo (JP)

( * ) Notice: Subject to any disclaimer, the term of this patent is extended or adjusted under 35 U.S.C. 154(b) by 255 days.

(21) Appl. No.: 14/652,068

(22) PCT Filed: Dec. 11, 2013

(86) PCT No.: PCT/JP2013/083220
§ 371 (c)(1),
(2) Date: Jun. 12, 2015

(87) PCT Pub. No.: WO2014/092121
PCT Pub. Date: Jun. 19, 2014

(65) Prior Publication Data
US 2015/0325884 A1 Nov. 12, 2015

(30) Foreign Application Priority Data
Dec. 13, 2012 (JP) ............... PCT/JP2012/082398

(51) Int. Cl.
*H01M 4/82* (2006.01)
*H01M 2/36* (2006.01)
(Continued)

(52) U.S. Cl.
CPC ........... *H01M 2/36* (2013.01); *H01M 4/0447* (2013.01); *H01M 10/0567* (2013.01);
(Continued)

(58) Field of Classification Search
CPC ......... H01M 10/0567; H01M 10/0583; H01M 10/0587; H01M 10/446; H01M 2/36; H01M 4/0447; H01M 10/052; Y10T 29/49112
(Continued)

(56) References Cited

U.S. PATENT DOCUMENTS 6,797,437 B2 * 9/2004 Tsukamoto ......... H01M 6/5088
252/62.2
7,476,468 B1 1/2009 Lam et al.
(Continued)

FOREIGN PATENT DOCUMENTS

| CN | 102420340 A | 4/2012 |
| JP | H06-013108 A | 1/1994 |

(Continued)

OTHER PUBLICATIONS

European Patent Office, Extended European Search Report issued in corresponding Application No. 3862668.4, dated Jul. 12, 2016.
(Continued)

*Primary Examiner* — Gary Harris
(74) *Attorney, Agent, or Firm* — Stites & Harbison, PLLC; Jeffrey A. Haeberlin; Rachel D. Rutledge

(57) ABSTRACT

A method for producing a non-aqueous electrolyte secondary battery according to the present invention is characterized in that the method comprises the steps of: placing an electrode body into an outer casing, the electrode body having a folded-separator structure or a wound structure in which a positive electrode including a positive-electrode active material and a negative electrode including a negative-electrode active material are stacked with a separator interposed therebetween; placing a non-aqueous electrolyte free of a flame retardant into the outer casing; charging the electrode body by applying a voltage between the positive
(Continued)

electrode and the negative electrode placed in the outer casing; placing a flame retardant into the outer casing; and sealing the outer casing, wherein the step of charging is a step of charging the electrode body with the state in which the surface of the positive-electrode active material and the surface of the negative-electrode active material are in contact with the non-aqueous electrolyte substantially free of the flame retardant.

10 Claims, 9 Drawing Sheets

(51) Int. Cl.
*H01M 10/44* (2006.01)
*H01M 10/0567* (2010.01)
*H01M 10/0583* (2010.01)
*H01M 10/0587* (2010.01)
*H01M 4/04* (2006.01)
*H01M 10/052* (2010.01)

(52) U.S. Cl.
CPC ... *H01M 10/0583* (2013.01); *H01M 10/0587* (2013.01); *H01M 10/446* (2013.01); *H01M 10/052* (2013.01); *Y10T 29/49112* (2015.01)

(58) Field of Classification Search
USPC ........................................................ 29/623.2
See application file for complete search history.

(56) References Cited

U.S. PATENT DOCUMENTS

| 2007/0015048 | A1* | 1/2007 | Lee .................. H01M 4/62 429/118 |
| 2010/0330410 | A1* | 12/2010 | Takahashi .......... H01M 2/1646 429/129 |
| 2011/0070504 | A1 | 3/2011 | Matsumoto et al. |
| 2011/0159379 | A1 | 6/2011 | Matsumoto et al. |
| 2012/0171542 | A1 | 7/2012 | Matsumoto et al. |
| 2012/0219865 | A1 | 8/2012 | Kaneko et al. |

FOREIGN PATENT DOCUMENTS

| JP | H11-317232 A | 11/1999 |
| JP | 2001 076759 A | 3/2001 |
| JP | 2012/089352 A | 5/2012 |
| WO | 2009/142251 A1 | 11/2009 |
| WO | 2010/030008 A1 | 3/2010 |
| WO | 2011/030686 A1 | 3/2011 |
| WO | 2011/052428 A1 | 5/2011 |

OTHER PUBLICATIONS

ISA/JPO, International Search Report in corresponding international application PCT/JP2013/083220, dated Jan. 14, 2014.

* cited by examiner

[Fig. 1]
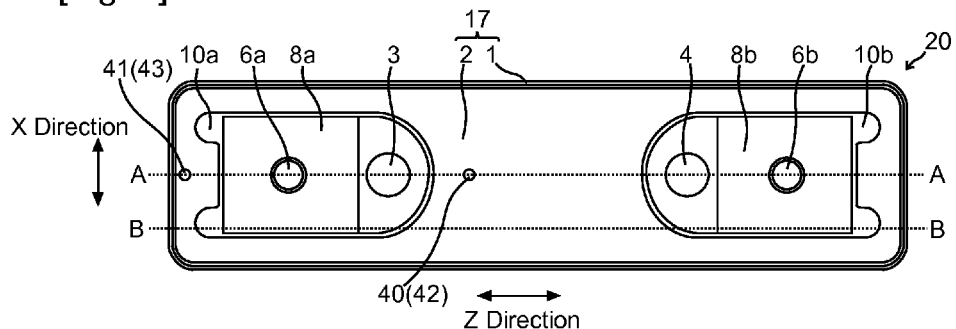
[Fig. 2]
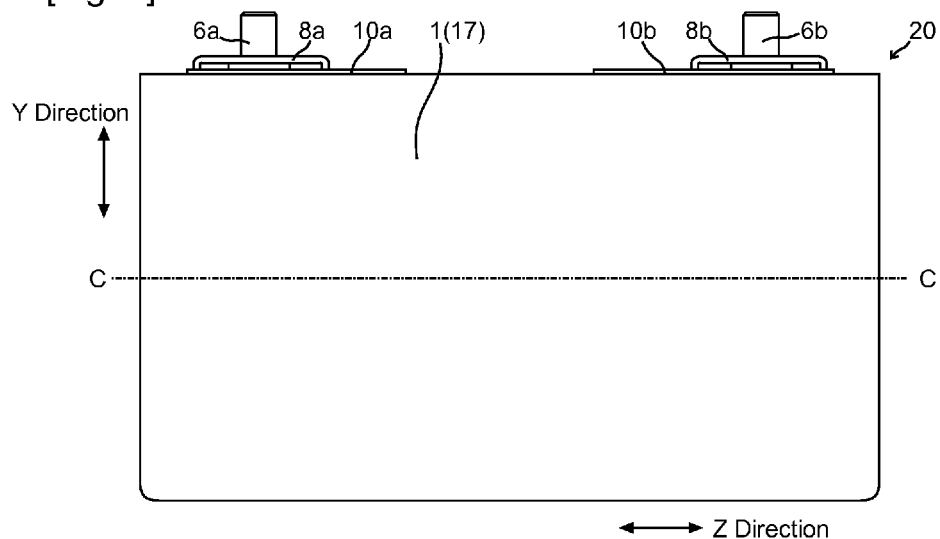
[Fig. 3]
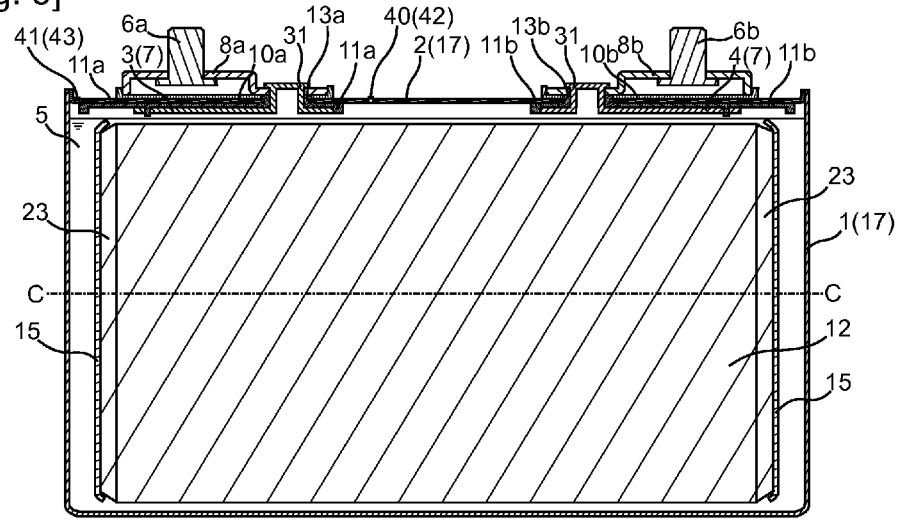

[Fig. 4]
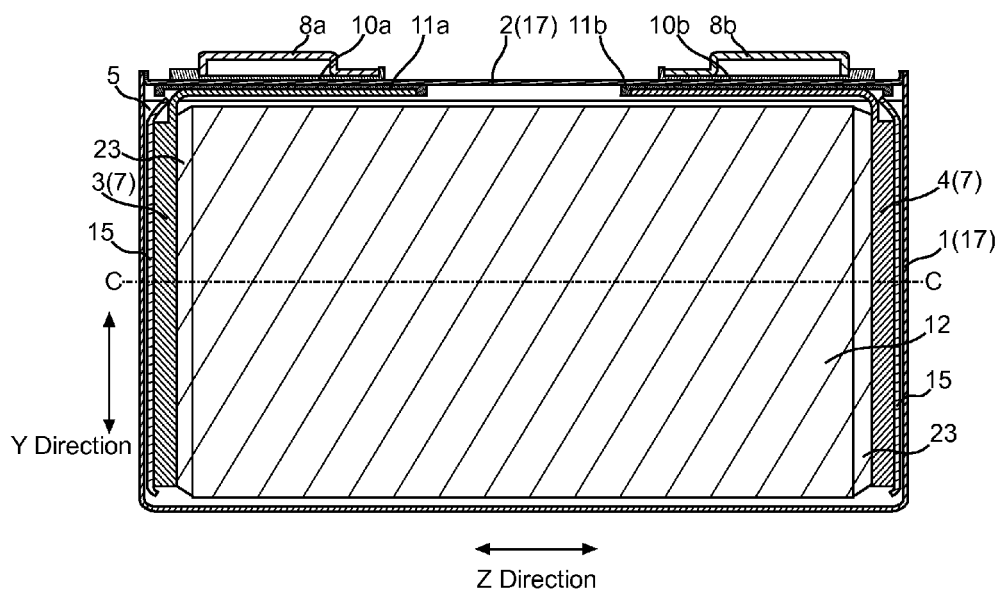
[Fig. 5]
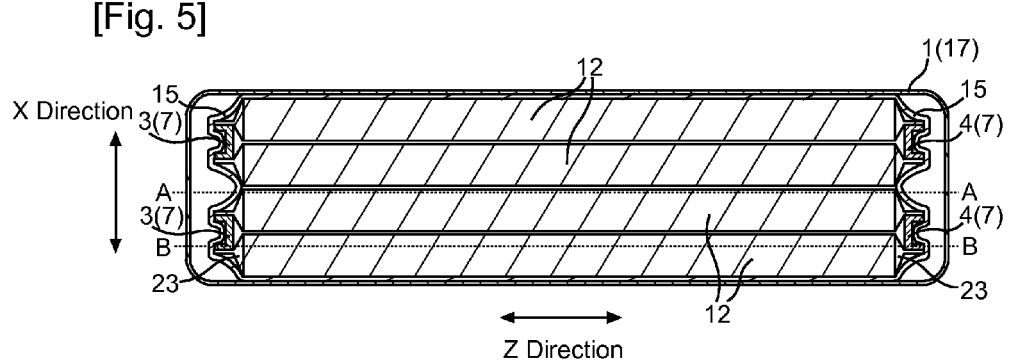

[Fig. 6]
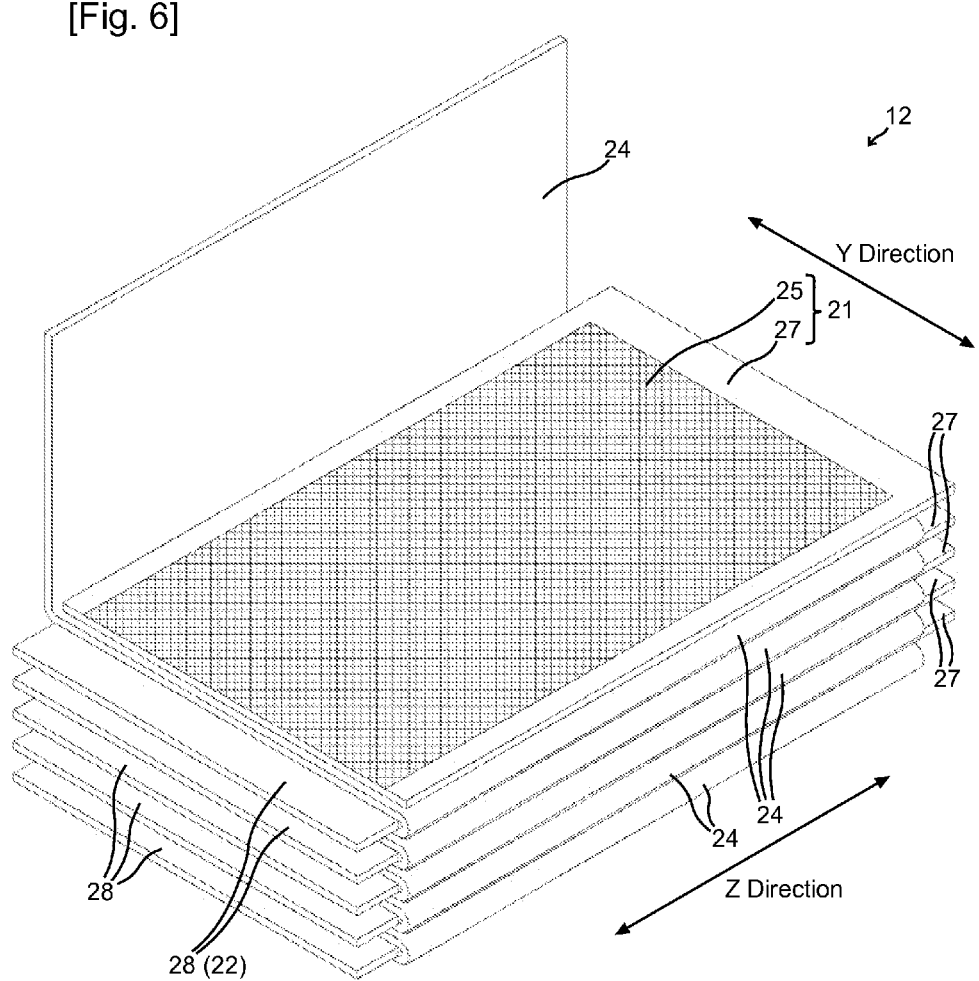

[Fig. 7]
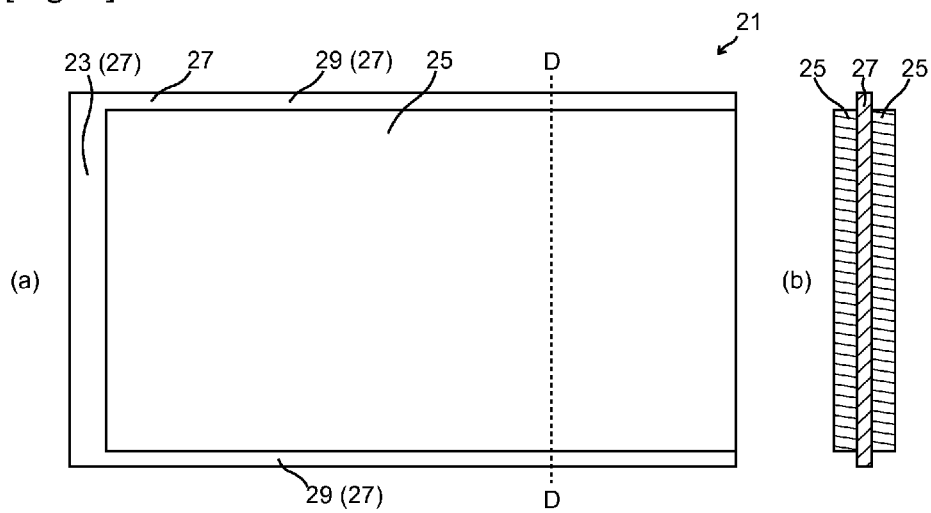
[Fig. 8]
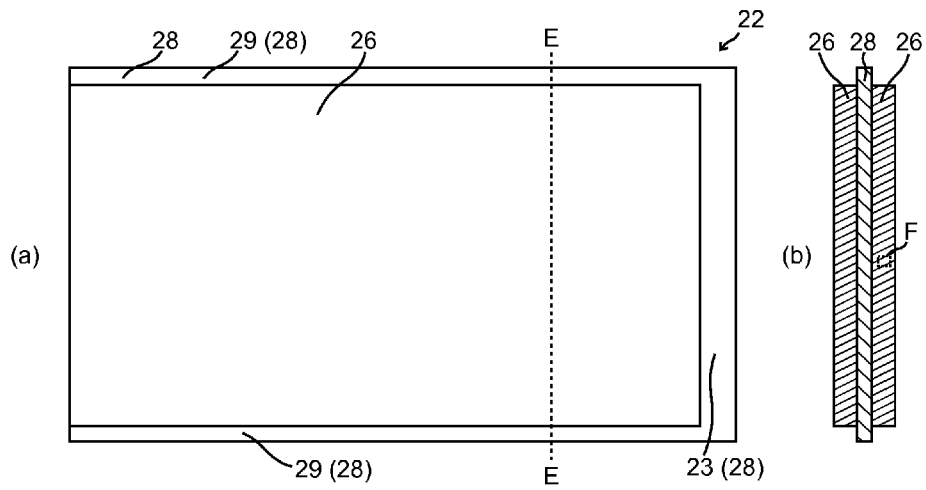

[Fig. 9]
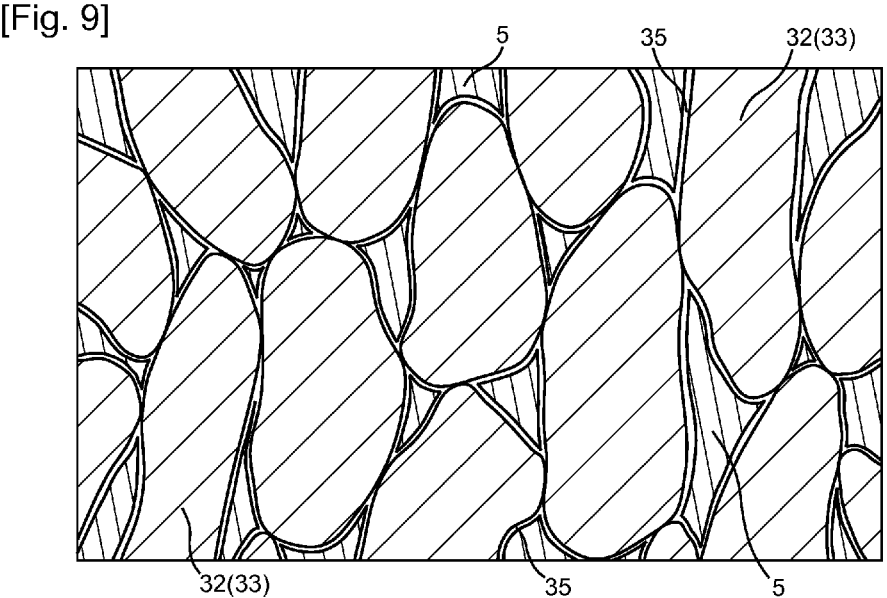
[Fig. 10]
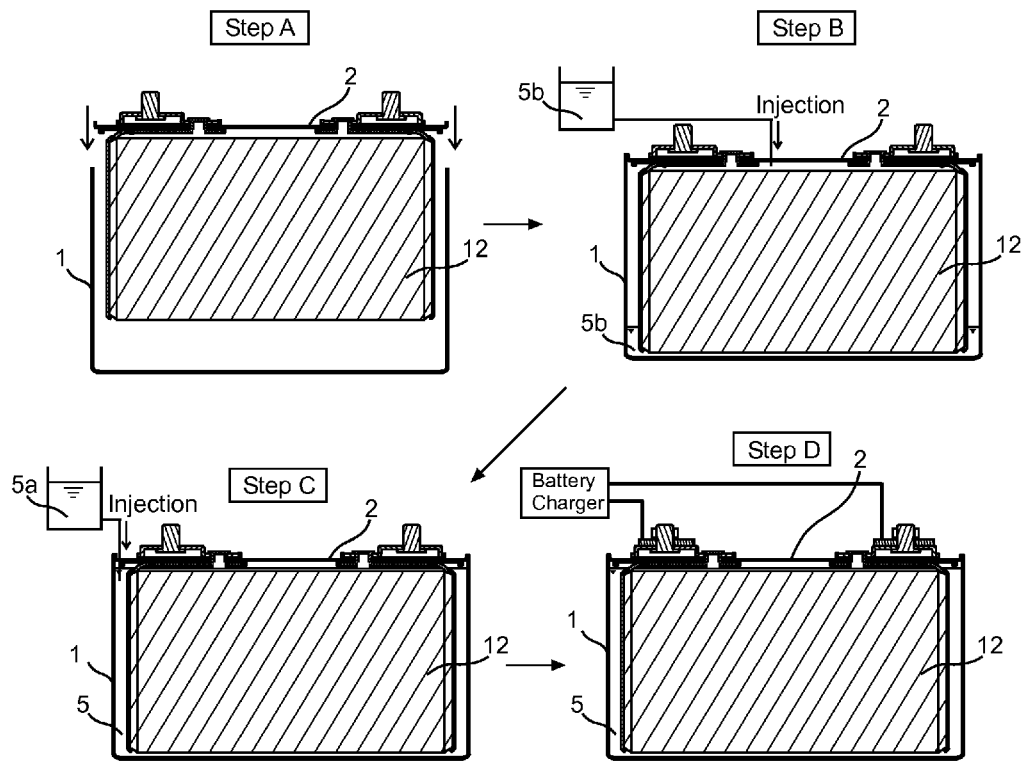

[Fig. 11]
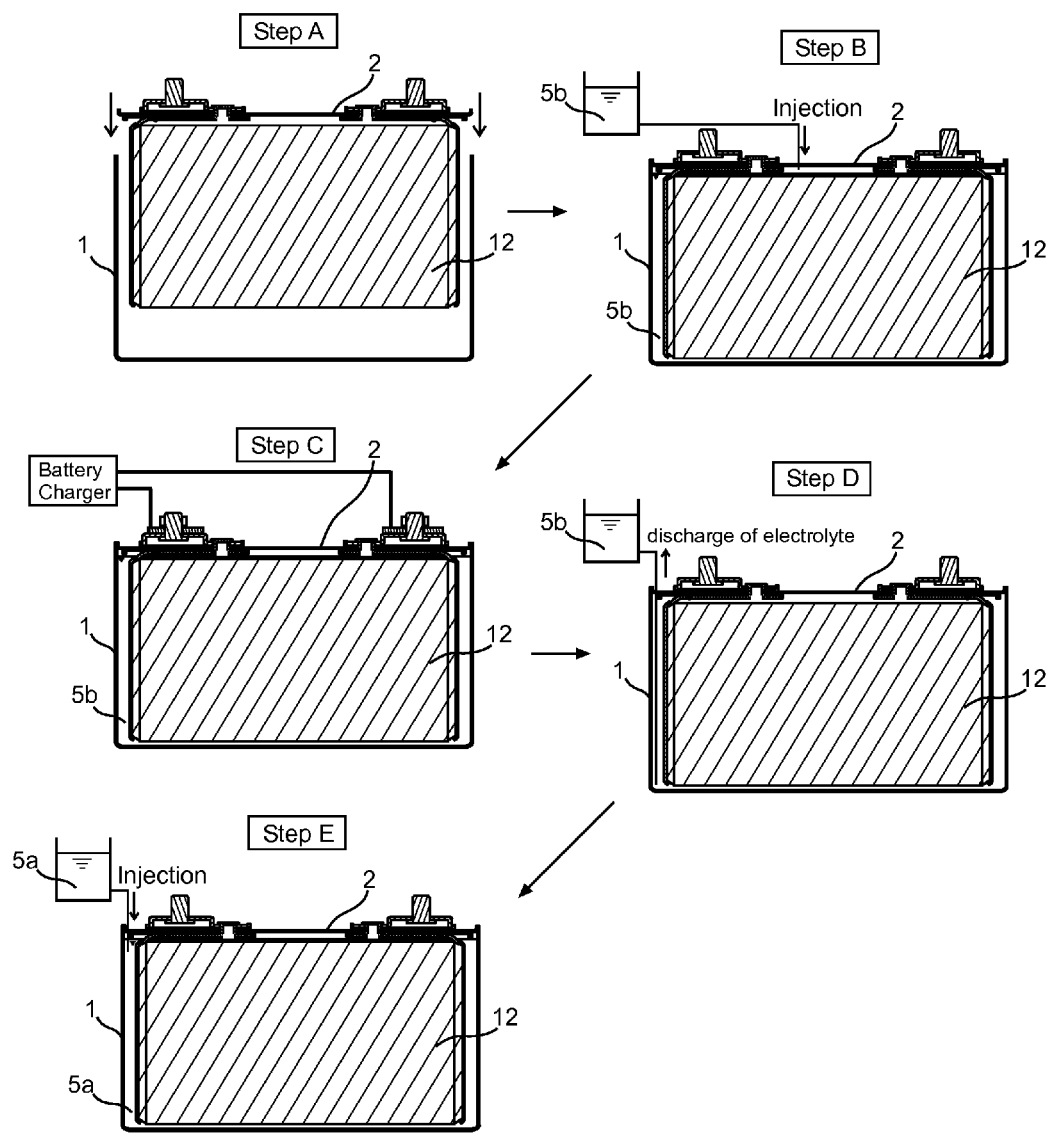

[Fig. 12]
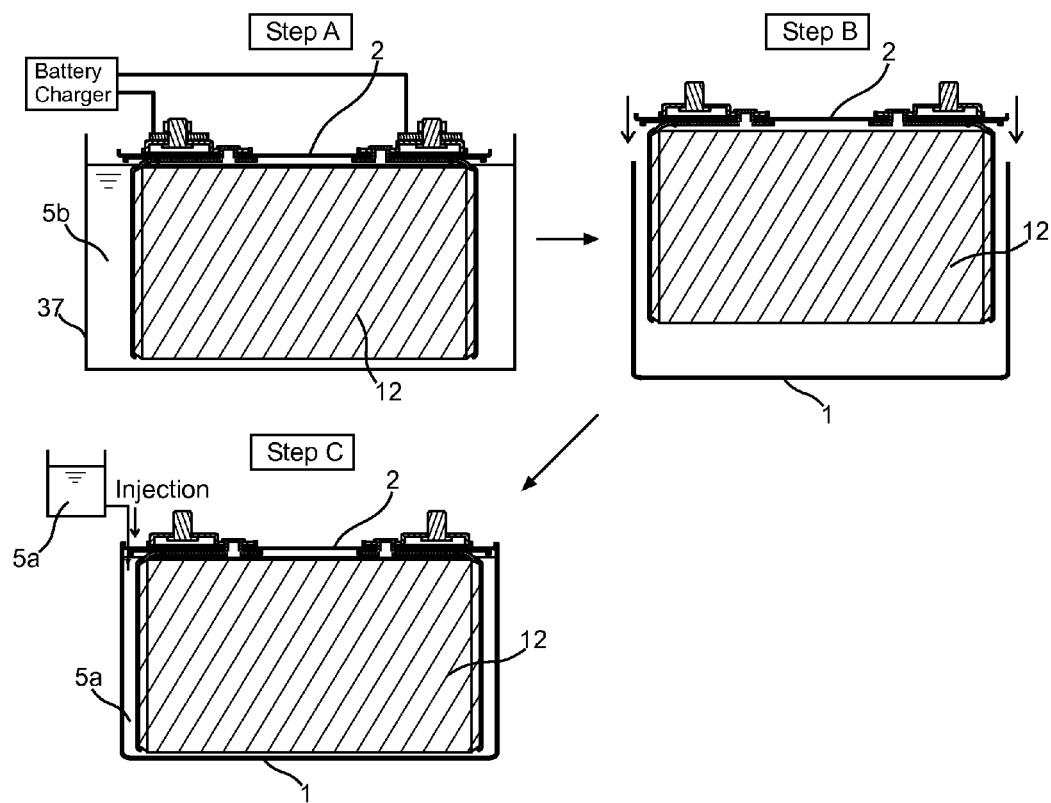

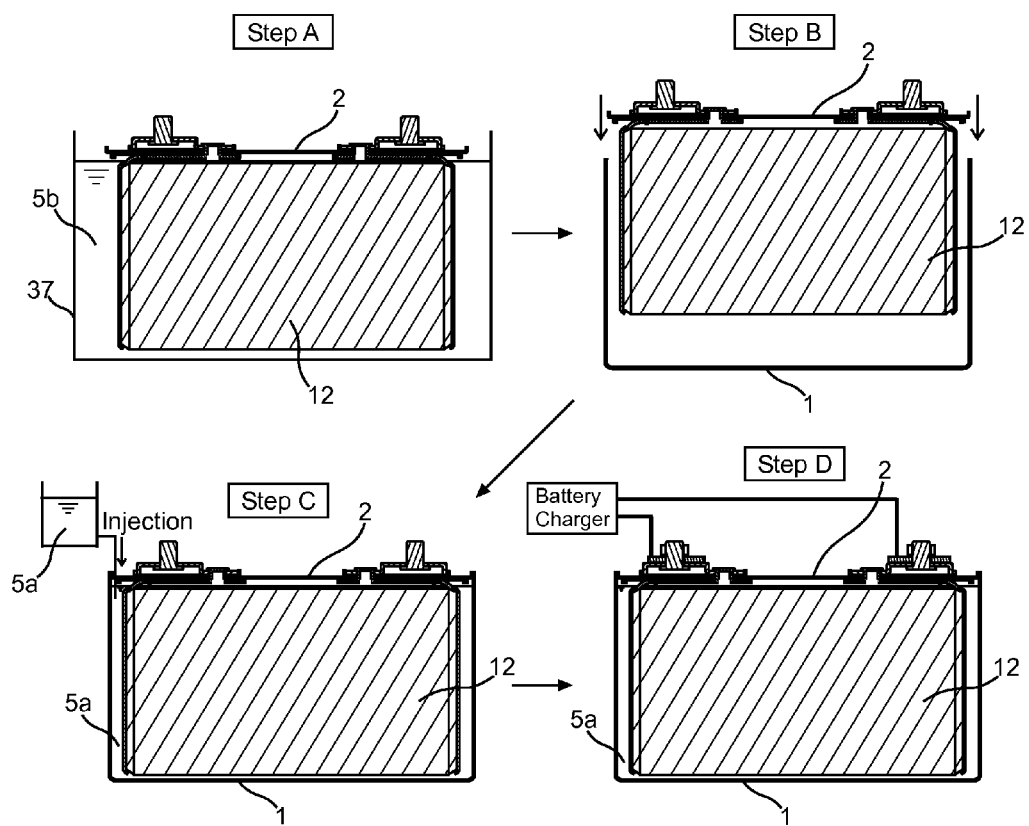

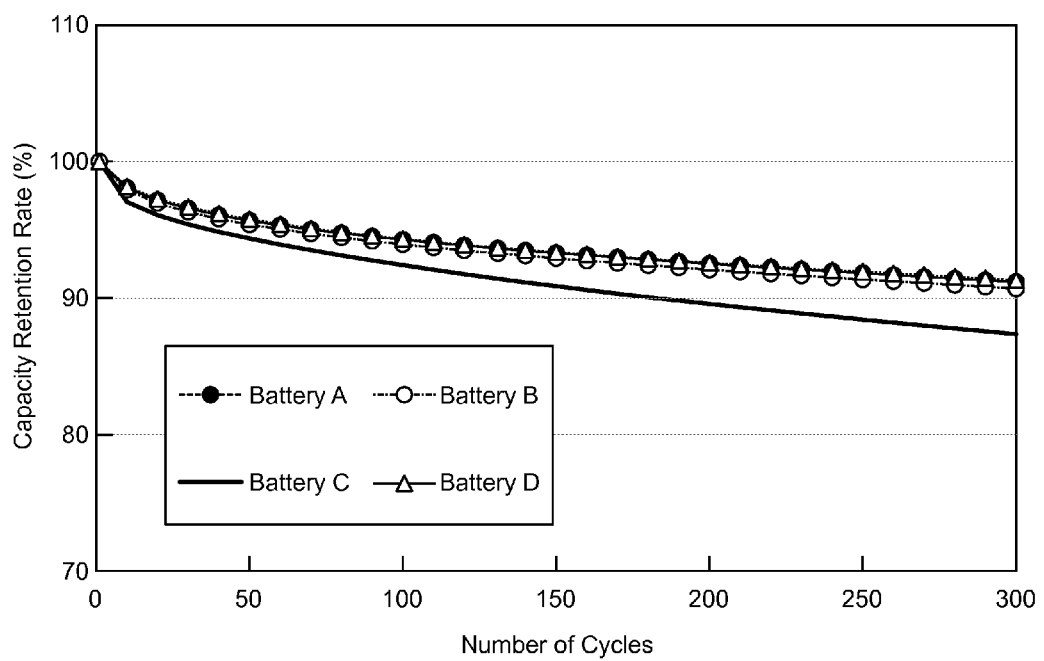
[Fig. 14]

METHOD FOR PRODUCING NON-AQUEOUS ELECTROLYTE SECONDARY BATTERY

TECHNICAL FIELD

The present invention relates to a method for producing a non-aqueous electrolyte secondary battery.

BACKGROUND ART

Lithium ion secondary batteries have attracted attention because of their high energy density and have been actively researched and developed.

A conventional lithium ion secondary battery often uses a solution prepared by dissolving a lithium salt such as $LiPF_6$ into a mixture solvent of cyclic carbonate such as ethylene carbonate (EC) or propylene carbonate (PC) and chain carbonate such as diethyl carbonate (DEC) or dimethyl carbonate (DMC) as an electrolyte solution. The non-aqueous electrolyte solution prepared by using these carbonates has a low flash point of about 30° C. Therefore, when an electrolyte solution leaks out by some accident in the presence of a fire source, there is a danger of a fire caused by the leaking electrolyte solution which catches fires. In view of this, various techniques of raising a flashpoint of an electrolyte solution have been studied. For example, mixing a flame retardant into an electrolyte solution has been studied as one of techniques of raising a flashpoint of an electrolyte solution (see Patent Document 1, for example).

CITATION LIST

Patent Document

Patent Document 1: Japanese Unexamined Patent Publication No. H11-317232
Patent Document 2: Japanese Unexamined Patent Publication No. H06-13108

DISCLOSURE OF THE INVENTION

Problem to be Solved by the Invention

In a conventional lithium ion secondary battery using an electrolyte solution containing a flame retardant, a flash point of the electrolyte solution rises to enhance safety to fires. However, the conventional lithium ion secondary battery has a problem such that various characteristics of the battery, especially life characteristics such as cycle characteristics and floating charge characteristics, are more significantly deteriorated than a battery not containing a flame retardant.

In view of the above-described circumstances, the present invention has been accomplished to provide a method for producing a non-aqueous electrolyte secondary battery that can suppress deterioration in life characteristics of the battery even if an electrolyte solution containing a flame retardant is used.

Means for Solving the Problems

The present invention provides a method for producing a non-aqueous electrolyte secondary battery, the method comprising the steps of: placing an electrode body into an outer casing, the electrode body having a folded-separator structure or a wound structure in which a positive electrode including a positive-electrode active material and a negative electrode including a negative-electrode active material are stacked with a separator interposed therebetween; placing a non-aqueous electrolyte free of a flame retardant into the outer casing; charging the electrode body by applying a voltage between the positive electrode and the negative electrode placed in the outer casing; placing a flame retardant into the outer casing; and sealing the outer casing, wherein the step of charging is a step of charging the electrode body with the state in which the surface of the positive-electrode active material and the surface of the negative-electrode active material are in contact with the non-aqueous electrolyte substantially free of the flame retardant.

The order of a plurality of steps included in the method for producing according to the present invention is optional, unless otherwise inconsistent.

Effect of the Invention

According to the present invention, the method includes the steps of placing the electrode body into the outer casing, the electrode body having the folded-separator structure or the wound structure in which the positive electrode including the positive-electrode active material and the negative electrode including the negative-electrode active material are stacked with the separator interposed therebetween; and placing the non-aqueous electrolyte free of a flame retardant into the outer casing. Therefore, a state in which the surface of the positive-electrode active material and the surface of the negative-electrode active material are in contact with the non-aqueous electrolyte substantially free of the flame retardant can be formed in the outer casing.

According to the present invention, the method includes the step of charging the electrode body by applying the voltage between the positive electrode and the negative electrode placed in the outer casing, wherein the step of charging is the step of charging the electrode body with the state in which the surface of the positive-electrode active material and the surface of the negative-electrode active material are in contact with the non-aqueous electrolyte which is substantially free of the flame retardant. Therefore, a solid electrolyte interface film substantially free of the flame retardant can be formed on the surface of the positive-electrode active material and the surface of the negative-electrode active material during the charging. According to the formation of the solid electrolyte interface film, the solid electrolyte interface film can be interposed between the non-aqueous electrolyte and the positive-electrode active material or the negative-electrode active material, and therefore, movement of ions between the non-aqueous electrolyte and the positive-electrode active material or the negative-electrode active material in charging and discharging can be stabilized.

In addition, the formation of the solid electrolyte interface film substantially free of the flame retardant can suppress a reduction of battery capacity, even if charging-discharging cycles of the non-aqueous electrolyte secondary battery are repeatedly performed. Especially when the non-aqueous electrolyte is a non-aqueous electrolyte solution, a drop in a flash point of the non-aqueous electrolyte solution can be suppressed. This can enhance battery life characteristics, and further, can enhance safety of the battery. These effects have been demonstrated by experiments conducted by the present inventor.

According to the present invention, the method includes the step of placing a flame retardant into the outer casing. Therefore, the non-aqueous electrolyte in the outer casing can include a flame retardant, which can raise the flash point of the non-aqueous electrolyte. Thus, safety of the battery can be enhanced.

According to the present invention, the method includes the step of sealing the outer casing. Therefore, the present invention can enhance sealing property of the non-aqueous electrolyte secondary battery, and therefore, can enhance safety of the battery.

BRIEF DESCRIPTION OF THE DRAWINGS

FIG. 1 is a schematic top view illustrating a non-aqueous electrolyte secondary battery according to one embodiment of the present invention.

FIG. 2 is a schematic side view illustrating the non-aqueous electrolyte secondary battery according to one embodiment of the present invention.

FIG. 3 is a schematic sectional view illustrating the non-aqueous electrolyte secondary battery taken along a dotted line A-A in FIG. 1.

FIG. 4 is a schematic sectional view illustrating the non-aqueous electrolyte secondary battery taken along a dotted line B-B in FIG. 1.

FIG. 5 is a schematic sectional view illustrating the non-aqueous electrolyte secondary battery taken along a dashed-dotted line C-C in FIG. 2.

FIG. 6 is an explanatory view illustrating an electrode body included in the non-aqueous electrolyte secondary battery according to one embodiment of the present invention.

FIG. 7 (a) is a schematic plan view illustrating a positive electrode included in the non-aqueous electrolyte secondary battery according to one embodiment of the present invention, and FIG. 7 (b) is a schematic sectional view illustrating the positive electrode taken along a dotted line D-D in FIG. 7 (a).

FIG. 8 (a) is a schematic plan view illustrating a negative electrode included in the non-aqueous electrolyte secondary battery according to one embodiment of the present invention, and FIG. 8 (b) is a schematic sectional view illustrating the negative electrode taken along a dotted line E-E in FIG. 8 (a).

FIG. 9 is a schematic sectional view illustrating a negative-electrode active material layer in a range F enclosed by a dotted line in FIG. 8.

FIG. 10 is a process diagram illustrating a method for producing the non-aqueous electrolyte secondary battery according to one embodiment of the present invention.

FIG. 11 is a process diagram illustrating a method for producing the non-aqueous electrolyte secondary battery according to one embodiment of the present invention.

FIG. 12 is a process diagram illustrating a method for producing a non-aqueous electrolyte secondary battery according to a reference embodiment.

FIG. 13 is a process diagram illustrating a method for producing a non-aqueous electrolyte secondary battery according to a reference embodiment.

FIG. 14 is a graph illustrating a measurement result of a charging-discharging cycle test.

MODE FOR CARRYING OUT THE INVENTION

A method for producing a non-aqueous electrolyte secondary battery according to the present invention is characterized in that the method comprises the steps of: placing an electrode body into an outer casing, the electrode body having a folded-separator structure or a wound structure in which a positive electrode including a positive-electrode active material and a negative electrode including a negative-electrode active material are stacked with a separator interposed therebetween; placing a non-aqueous electrolyte free of a flame retardant into the outer casing; charging the electrode body by applying a voltage between the positive electrode and the negative electrode placed in the outer casing; placing a flame retardant into the outer casing; and sealing the outer casing, wherein the step of charging is a step of charging the electrode body with the state in which the surface of the positive-electrode active material and the surface of the negative-electrode active material are in contact with the non-aqueous electrolyte substantially free of the flame retardant.

The present invention may also include a non-aqueous electrolyte secondary battery produced with the method for producing according to the present invention.

In the method for producing according to the present invention, the step of placing the flame retardant is preferably a step of placing a non-aqueous electrolyte containing the flame retardant dissolved therein into the outer casing.

With this feature, the concentration of the flame retardant in the non-aqueous electrolyte in the outer casing can easily be stabilized.

Preferably, the method for producing according to the present invention further includes a step of permeating the non-aqueous electrolyte free of a flame retardant into the positive electrode and the negative electrode, which have been placed into the outer casing, wherein the step of placing the flame retardant is a step of placing the flame retardant into the outer casing that houses the positive electrode and the negative electrode, into which the non-aqueous electrolyte free of a flame retardant has been permeated, and the step of charging is a step of charging the electrode body after the flame retardant is placed into the outer casing.

With this feature, a solid electrolyte interface film that is substantially free of the flame retardant is formed on the surface of the positive-electrode active material and on the surface of the negative-electrode active material, and further, a number of the steps for producing the non-aqueous electrolyte secondary battery in which the non-aqueous electrolyte contains a flame retardant can be reduced, which can decrease production cost.

Preferably, the method for producing according to the present invention further includes a step of removing the non-aqueous electrolyte free of a flame retardant from the outer casing, wherein the step of placing the flame retardant is a step of placing the non-aqueous electrolyte containing the flame retardant dissolved therein into the outer casing from which the non-aqueous electrolyte free of a flame retardant has already been removed.

With this feature, the non-aqueous electrolyte free of a flame retardant and the non-aqueous electrolyte containing the flame retardant dissolved therein can be replaced, and therefore, the state in which the surface of the positive-electrode active material and the surface of the negative-electrode active material are in contact with the non-aqueous electrolyte substantially free of the flame retardant can easily be formed.

Preferably, in the method for producing according to the present invention, the outer casing has a first inlet and a second inlet, wherein the first inlet is an opening for injecting the non-aqueous electrolyte free of a flame retardant into the outer casing, and is closed after the injection of the non-aqueous electrolyte, and the second inlet is an opening for injecting the non-aqueous electrolyte containing the flame retardant dissolved therein into the outer casing, and is closed after the injection of the non-aqueous electrolyte.

With this feature, an inlet for the non-aqueous electrolyte free of a flame retardant and an inlet for the non-aqueous electrolyte containing the flame retardant can be separately provided, whereby the production cost can be reduced.

Preferably, in the method for producing according to the present invention, the second inlet is formed to enable the injection of the non-aqueous electrolyte between the electrode body and the outer casing.

This feature can prevent the flame retardant contained in the non-aqueous electrolyte injected from the second inlet from entering the electrode body, and therefore, can maintain the state in which the surface of the positive-electrode active material and the surface of the negative-electrode active material are in contact with the non-aqueous electrolyte substantially free of the flame retardant can be formed in the outer casing.

Preferably, in the method for producing according to the present invention, the step of charging is a step of charging the electrode body with the state in which the flame retardant placed in the outer casing is not substantially dissolved in the non-aqueous electrolyte in the electrode body.

With this feature, even if the flame retardant is directly placed in the outer casing, the state in which the surface of the positive-electrode active material and the surface of the negative-electrode active material are in contact with the non-aqueous electrolyte which is substantially free of the flame retardant can be maintained.

Preferably, in the method for producing according to the present invention, the step of placing the flame retardant is a step of placing a flame retardant coated with a sustained release film into the outer casing.

This feature can reduce the speed of dissolving the flame retardant placed in the outer casing into the non-aqueous electrolyte, and therefore, can maintain the state in which the surface of the positive-electrode active material and the surface of the negative-electrode active material are in contact with the non-aqueous electrolyte which is substantially free of the flame retardant.

Preferably, in the method for producing according to the present invention, the flame retardant is a phosphazene compound or a phosphoric ester compound.

With this feature, the flash point of the non-aqueous electrolyte can be raised, whereby safety of the non-aqueous electrolyte secondary battery can be enhanced.

Preferably, in the method for producing according to the present invention, the non-aqueous electrolyte contains ethylene carbonate, vinylene carbonate, or fluoroethylene carbonate.

This feature can enhance quality of the solid electrolyte interface film formed on the surface of the positive-electrode active material or on the surface of the negative-electrode active material, and therefore, can enhance life characteristics of the non-aqueous electrolyte secondary battery.

Hereinafter, an embodiment of the present invention will be described with reference to the drawings. Structures shown in the drawings or the following descriptions are just exemplifications and the scope of the present invention is not limited thereto.

Structure and Production Method of Non-Aqueous Electrolyte Secondary Battery

FIG. 1 is a schematic top view illustrating a non-aqueous electrolyte secondary battery according to the present embodiment, FIG. 2 is a schematic side view illustrating the non-aqueous electrolyte secondary battery according to the present embodiment, FIG. 3 is a schematic sectional view illustrating the non-aqueous electrolyte secondary battery taken along a dotted line A-A in FIG. 1, FIG. 4 is a schematic sectional view illustrating the non-aqueous electrolyte secondary battery taken along a dotted line B-B in FIG. 1, and FIG. 5 is a schematic sectional view illustrating the non-aqueous electrolyte secondary battery taken along a dashed-dotted line C-C in FIG. 2. FIG. 6 is an explanatory view illustrating an electrode body included in the non-aqueous electrolyte secondary battery according to the present embodiment, FIG. 7 (a) is a schematic plan view illustrating a positive electrode included in the non-aqueous electrolyte secondary battery according to the present embodiment, and FIG. 7 (b) is a schematic sectional view illustrating the positive electrode taken along a dotted line D-D in FIG. 7 (a). FIG. 8 (a) is a schematic plan view illustrating a negative electrode included in the non-aqueous electrolyte secondary battery according to the present embodiment, and FIG. 8 (b) is a schematic sectional view illustrating the negative electrode taken along a dotted line E-E in FIG. 8 (a). FIG. 9 is a schematic sectional view illustrating a negative-electrode active material layer in a range F enclosed by a dotted line in FIG. 8.

A non-aqueous electrolyte secondary battery 20 according to the present embodiment includes an electrode body 12 having a structure in which a positive electrode 21 including a positive-electrode active material and a negative electrode 22 including a negative-electrode active material 33 are stacked with a separator 24 interposed therebetween; a non-aqueous electrolyte 5 containing a flame retardant; and an outer casing 17 accommodating the electrode body 12 and the non-aqueous electrolyte 5, wherein the negative electrode 22 has a solid electrolyte interface film 35 formed on the surface of the negative-electrode active material 33, and the solid electrolyte interface film 35 has a portion composed of a component derived from a non-aqueous electrolyte substantially free of the flame retardant.

A method for producing the non-aqueous electrolyte secondary battery 20 according to the present embodiment includes the steps of: placing the electrode body 12 into the outer casing 17, the electrode body 12 having a folded-separator structure or a wound structure in which the positive electrode 21 including the positive-electrode active material and the negative electrode 22 including the negative-electrode active material are stacked with the separator 24 interposed therebetween; placing a non-aqueous electrolyte free of a flame retardant into the outer casing 17; charging the electrode body by applying a voltage between the positive electrode 21 and the negative electrode 22 placed in the outer casing 17; placing a flame retardant into the outer casing 17; and sealing the outer casing 17, wherein the step of charging is a step of charging the electrode body with the state in which the surface of the positive-electrode active material and the surface of the negative-electrode active material are in contact with the non-aqueous electrolyte substantially free of the flame retardant.

The order of a plurality of steps included in the method for producing according to the present invention is optional, unless otherwise inconsistent.

Hereinafter, the non-aqueous electrolyte secondary battery 20 of the present embodiment and its method for producing will be described.

1. Outer Casing

The outer casing 17 may be made of a hard material or a soft material. A material that can popularly be used for a non-aqueous electrolyte secondary battery can be used for the non-aqueous electrolyte secondary battery of the present invention.

In the case of the outer casing made of a hard material, the material of the outer casing is not particularly limited, so long as it is not so greatly deformed even if the electrode body 12, a positive-electrode current collector 3, a negative-electrode current collector 4, and a non-aqueous electrolyte solution 5 are accommodated therein. Examples of the material of the outer casing 17 include a metal material such as aluminum, aluminum alloy, iron, iron alloy, or stainless, a material formed by plating nickel, tin, chromium, or zinc to the metal material, or a rigid plastic.

In the case of the outer casing made of a soft material, the material of the outer casing is not particularly limited, so long as the electrode body 12, the positive-electrode current collector 3, the negative-electrode current collector 4, and the non-aqueous electrolyte solution 5, which are accommodated therein, do not leak therefrom. For example, a laminate pouch can be used.

The outer casing 17 has a battery case 1 for accommodating the electrode body 12. The outer casing 17 may also have a lid member 2.

The battery case 1 can accommodate the electrode body 12, the positive-electrode current collector 3, the negative-electrode current collector 4, and the non-aqueous electrolyte solution 5 therein. The battery case 1 can also be bonded to the lid member 2.

The shape of the battery case 1 may be rectangle, cylindrical, a thin shape, or a coin shape.

The battery case 1 has an opening into which the electrode body 12 is inserted into the battery case 1. This opening is closed by the lid member 2. Thus, the electrode body 12 can be accommodated into the battery case 1.

The lid member 2 closes the opening formed on the battery case 1 for inserting the electrode body 12. The battery case 1 and the lid member 2 are bonded by a laser welding, resistance welding, ultrasonic welding, or caulking, or by use of an adhesive agent, to seal the battery case 1. The positive-electrode current collector 3 and the negative-electrode current collector 4 can be fixed to the lid member 2. The electrode body 12 can be connected to the positive-electrode current collector 3 and the negative-electrode current collector 4. With this, the lid member 2, the positive-electrode current collector 3, the negative-electrode current collector 4, and the electrode body 12 can be formed integral. The positive-electrode current collector 3, the negative-electrode current collector 4, and the electrode body 12, which are integrated, are put into the battery case 1, and the opening of the battery case 1 is closed by the lid member 2. Thus, the electrode body 12 connected to the positive-electrode current collector 3 and the negative-electrode current collector 4 can be accommodated into the outer casing 17. The non-aqueous electrolyte solution 5 can be injected into the outer casing 17 after the opening of the battery case 1 is closed by the lid member 2.

The lid member 2 can be formed with a first inlet 40 and the second inlet 41.

The first inlet 40 is an opening from which a non-aqueous electrolyte free of a flame retardant is injected into the outer casing 17.

The first inlet 40 may also be used for removing the non-aqueous electrolyte free of a flame retardant from the outer casing 17.

The first inlet 40 is also closed by a first sealing member 42 after the injection of the non-aqueous electrolyte into the outer casing 17. The step of closing the first inlet 40 with the first sealing member 42 may be performed in the step of sealing the outer casing 17.

The second inlet 41 is an opening from which a non-aqueous electrolyte containing a flame retardant dissolved therein is injected into the outer casing 17. The second inlet 41 may also be used for removing the non-aqueous electrolyte free of a flame retardant from the outer casing 17.

The second inlet 41 is also closed by a second sealing member 43 after the injection of the non-aqueous electrolyte into the outer casing 17. The step of closing the second inlet 41 with the second sealing member 43 may be performed in the step of sealing the outer casing 17.

The second inlet 41 may be formed so as to enable an injection of the non-aqueous electrolyte between the electrode body 12 and the outer casing 17. According to this configuration, the non-aqueous electrolyte containing the flame retardant dissolved therein can be injected between the electrode body 12 and the outer casing 17 while keeping a state in which a non-aqueous electrolyte substantially free of the flame retardant is retained in the electrode body 12.

2. Non-Aqueous Electrolyte, Electrode Body

The non-aqueous electrolyte solution 5 serving as a non-aqueous electrolyte is accommodated into the outer casing 17 together with the electrode body 12. Thus, the electrode body 12 is dipped in the non-aqueous electrolyte solution 5, so that a positive-electrode active material layer 25 and a negative-electrode active material layer 26 included in the electrode body 12 contain the non-aqueous electrolyte solution 5.

The non-aqueous electrolyte solution 5 contains supporting electrolyte salt containing ions that move charges, such as lithium ions or sodium ions, as a solute. Therefore, charges can be moved between the positive-electrode active material and the negative-electrode active material via the non-aqueous electrolyte solution, and hence, the non-aqueous electrolyte secondary battery 20 can be charged and discharged.

At least a part of the non-aqueous electrolyte solution 5 in the outer casing 17 contains a flame retardant as a solute. With this, a flash point of the non-aqueous electrolyte solution 5 can be raised, and therefore, safety of the non-aqueous electrolyte secondary battery 20 can be enhanced.

The non-aqueous electrolyte solution 5 can contain ethylene carbonate. The non-aqueous electrolyte solution 5 can also contain an additive agent such as vinylene carbonate (VC) or fluoroethylene carbonate (FEC).

The flame retardant concentration in the non-aqueous electrolyte solution 5 in the electrode body 12 may be lower than the flame retardant concentration in the non-aqueous electrolyte solution 5 between the electrode body 12 and the outer casing 17. With this feature, the flame retardant in the non-aqueous electrolyte solution supplied to the positive-electrode active material layer or the negative-electrode active material layer is reduced. This prevents the consumption of the flame retardant due to an electrochemical reaction in the electrode active material. Therefore, the reduction in the flame retardant concentration in the non-aqueous electrolyte solution 5 can be prevented. The flame retardant concentration in the non-aqueous electrolyte solution 5 can be measured by extracting and analyzing the non-aqueous electrolyte solution 5 in the electrode body 12 and the non-aqueous electrolyte solution 5 between the outer casing 17 and the electrode body 12 after the battery is disassembled.

The non-aqueous electrolyte solution in the electrode body 12 means here a non-aqueous electrolyte solution retained in the electrode body 12, i.e., a non-aqueous electrolyte solution in pores of the electrode active material layer, a non-aqueous electrolyte solution in a gap between an electrode and a separator, and a non-aqueous electrolyte solution inside a fixing member such as a shrink tube 15 holding electrodes together.

The non-aqueous electrolyte solution between the electrode body and the outer casing means a non-aqueous electrolyte solution between the outermost separator that fixes the electrode body all together and the outer casing 17. When a fixing member, such as the shrink tube 15, for fixing the electrode body 12 is provided, the non-aqueous electrolyte solution between the electrode body and the outer casing means a non-aqueous electrolyte solution between the fixing member and the outer casing 17.

The present embodiment describes, as one example, a structure in which the positive electrode 12 and the negative electrode 22 are stacked, and the separator 24 is disposed between the positive electrode 21 and the negative electrode 22. However, the present embodiment is applicable to a battery having other structures, for example, a battery whose electrode body 12 has a wound structure. When an opening is formed at the center of the wound structure, the inside of the opening is not considered as the inside of the electrode body 12. Specifically, a non-aqueous electrolyte solution in this opening is not included in the non-aqueous electrolyte solution in the electrode body, but corresponds to the non-aqueous electrolyte solution between the electrode body and the outer casing.

The non-aqueous electrolyte solution 5 in the pores of the positive-electrode active material layer 25 or the negative-electrode active material layer 26 may have a lower flame retardant concentration than that in the non-aqueous electrolyte solution 5 between the electrode body 12 and the outer casing 17. This prevents the consumption of the flame retardant due to an electrochemical reaction in the electrode active material. Therefore, the reduction in the flame retardant concentration in the non-aqueous electrolyte solution 5 can be prevented. The flame retardant concentration in the non-aqueous electrolyte solution 5 in the pores of the positive-electrode active material layer 25 or the negative-electrode active material layer 26 can be measured with a process in which the battery is disassembled to extract the positive electrode 21 or the negative electrode 22, and then, the non-aqueous electrolyte solution is extracted from the positive electrode 21 or the negative electrode 22 with a centrifuge or the like to analyze the flame retardant concentration.

The non-aqueous electrolyte solution can use carbonates, lactones, ethers, esters, etc. as a solvent. Two or more kinds of these solvents can be used as a mixture. Among these, especially a solvent prepared by mixing cyclic carbonate such as ethylene carbonate (EC) or propylene carbonate (PC) and chain carbonate such as diethyl carbonate (DEC) or dimethyl carbonate (DMC) is preferable.

The non-aqueous electrolyte solution is prepared by dissolving a lithium salt serving as a supporting electrolyte salt, such as $LiCF_3SO_3$, $LiAsF_6$, $LiClO_4$, $LiBF_4$, $LiPF_6$, $LiBOB$, $LiN(CF_3SO_2)_2$, or $LiN(C_2F_5SO_2)$, or a sodium salt solute such as $NaClO_4$, $NaPF_6$, $NaAsF_6$, $NaSbF_6$, $NaBF_4$, $NaCF_3SO_3$, $NaN(SO_2CF_3)_2$, a sodium salt of lower aliphatic carboxylic acid, or $NaAlCl_4$ in a solvent.

The present embodiment describes a liquid electrolyte solution as an electrolyte. However, the present embodiment is applicable to other electrolytes such as a polymer electrolyte. It has been known that a polymer electrolyte includes a gel electrolyte including an electrolyte solution and an intrinsic polymer electrolyte not including an electrolyte solution.

The gel electrolyte has a structure in which the above liquid electrolyte is injected into a matrix polymer composed of an ion conductive polymer. Examples of the ion conductive polymer used as a matrix polymer include polyethylene oxide (PEO), polypropylene oxide (PPO), and a copolymer of these materials.

The intrinsic polymer electrolyte has a structure in which supporting electrolyte salts (lithium salts) are dissolved in the above matrix polymer. The intrinsic polymer electrolyte does not contain an organic solvent serving as a plasticizer. The intrinsic polymer electrolyte has no fear of leakage from a battery, whereby reliability of the battery can be enhanced.

Examples of the flame retardant contained in the non-aqueous electrolyte solution include a phosphazene compound or a phosphoric ester compound. Examples of the phosphoric ester include triethyl phosphate, tripropyl phosphate, tributyl phosphate, triphenyl phosphate, tritolyl phosphate, and tris(trifluoroethyl)phosphate.

Examples of the phosphazene compound include a cyclic phosphazene derivative represented by $(NPR_2)_n$ substituted with a substituent R (wherein, n is 3 to 15, and examples of R include a halogen group such as fluorine; an alkoxy group such as an ethoxy group, propoxy group, or methoxy ethoxy methyl group; an alkoxy-substituted alkoxy group; or an aryl group such as a phenoxy group. Further, hydrogen in the above substituent or a side chain group can be substituted with a halogen element such as fluorine.) Examples of another phosphazene compound include a chain phosphazene derivative represented by, for example, $R—(PR_2=N)_m—PR$ (wherein, m is 1 to 20, and examples of R include a halogen group such as fluorine; an alkoxy group such as an ethoxy group, propoxy group, or methoxy ethoxy methyl group; an alkoxy-substituted alkoxy group; or an aryl group such as a phenoxy group. Further, hydrogen in the above substituent or a side chain group can be substituted with a halogen element such as fluorine.) which has a chain bind of phosphoric acid and nitrogen as a basic structure, and has a side chain group R added to phosphor.

Among these, a cyclic phosphazene derivative is preferable, and especially a derivative in which R is an alkoxy group and fluorine is preferable.

Preferably, the non-aqueous electrolyte solution used for forming an SEI on the surface of the positive-electrode active material or the negative-electrode active material 33 does not contain a flame retardant.

An additive agent such as VC (vinylene carbonate), PS (propane sultone), VEC (vinyl ethyl carbonate), PRS (propene sultone), or FEC (fluoroethylene carbonate) may be mixed singly in the non-aqueous electrolyte solution, or two or more kinds of these additive agents may be mixed, according to need.

The flame retardant may be injected into the outer casing 17 as a non-aqueous electrolyte solution containing a flame retardant dissolved therein, or may be injected into the outer casing 17 separate from the non-aqueous electrolyte solution.

When a flame retardant is not quickly dissolved in the non-aqueous electrolyte solution, the flame retardant may be injected into the outer casing 17 before the electrode body 12 is placed into the outer casing 17 or before the non-aqueous electrolyte solution free of flame retardant is injected into the outer casing 17. In this case, it takes time for the flame retardant to be dissolved in the non-aqueous electrolyte solution, whereby a state in which the surface of the positive-electrode active material and the surface of the negative-electrode active material are brought into contact with the non-aqueous electrolyte solution substantially free of the flame retardant can be formed.

The flame retardant may be injected into the outer casing 17 as coated with a sustained release film. This configuration allows the flame retardant to be gradually dissolved in the non-aqueous electrolyte solution. The sustained release film is a coating film made of a sustained release polymer. The flame retardant may be injected into the outer casing 17 in a form of a capsule with the sustained release film, or the flame retardant may be coated with the sustained release film, and the resultant may be applied on an inner wall of the outer casing.

The electrode body 12 causes a battery reaction with the non-aqueous electrolyte solution 5 filled in the outer casing 17. Due to this battery reaction, the non-aqueous electrolyte secondary battery 20 can be discharged and charged. The electrode body 12 includes the separator 24, and the positive electrodes 21 and the negative electrodes 22 disposed via the separator 24. As illustrated in FIG. 6, the electrode body 12 can be configured to include the separator 24 folded in zigzag, and the positive electrodes 21 and the negative electrodes 22, wherein the positive electrodes 21 and the negative electrodes 22 are disposed in valley folds of the separator 24, and each of the positive electrodes 21 and each of the negative electrodes 22 are disposed alternately with the separator 24 interposed therebetween. An end of the separator 24 may wrap a stacked body of the positive electrodes 21 and the negative electrodes 22 to completely cover the electrode body 12, and may be fixed with a tape.

In the present embodiment, the above stacked (zigzag) structure is illustrated. However, a wound structure in which a positive-electrode foil and a negative-electrode foil disposed via a generally used separator are wound, a folded-separator structure in which a positive-electrode foil and a negative-electrode foil disposed via a separator are folded, and a stacked structure in which the positive electrode 21 and the negative electrode 22 disposed via the individual separator 24 are stacked can be employed.

The separator 24 has a sheet-like structure, and is disposed between the positive electrode 21 and the negative electrode 22. The separator 24 can prevent a short-circuit current from flowing between the positive electrode 21 and the negative electrode 22. The separator 24 is not particularly limited, so long as it can transmit ions that move charges. For example, a microporous film of polyolefin can be used.

The positive electrode 21 includes a positive-electrode current collector sheet 27, and a positive-electrode active material layer 25 formed on both surfaces of the positive-electrode current collector sheet 27. The positive electrode 21 can be formed as illustrated in FIGS. 7(a) and (b), for example. It can be formed by forming the positive-electrode active material layer 25 on both surfaces of the rectangular positive-electrode current collector sheet 27. The positive electrode 21 can be formed to have an electrode connection portion 23 that is connected to the positive-electrode current collector 3. The electrode connection portion 23 in FIG. 7(a) can be formed such that the positive-electrode active material layer 25 is not formed on both surfaces of the positive-electrode current collector sheet 27 at the end of the positive electrode 21. The electrode connection portion 23 can also be formed such that a convex lug portion protruding outwardly from one end of the positive-electrode current collector sheet 27 is formed on this end, and the positive-electrode active material layer 25 is not formed on the lug portion.

The positive-electrode current collector sheet 27 is not particularly limited, so long as it has an electric conduction property, and has the positive-electrode active material layer 25 formed on its surface. For example, a metal foil is used. Preferably, an aluminum foil is used.

The positive-electrode active material layer 25 can be formed on the positive-electrode current collector sheet 27 by adding a conductive agent or binder to a positive-electrode active material by a known method such as a coating method. The positive-electrode active material layer 25 can be formed to have porosity. The positive-electrode active material can be a lithium transition-metal composite oxide that can reversibly extract and insert lithium ions, such as $LiCoO_2$, $LiNiO_2$, $LiNi_xCo_{1-x}O_2$ (x=0.01 to 0.99), $LiMnO_2$, $LiMn_2O_4$, and $LiCo_xMn_yNi_zO_2$ (x+y+z=1), or olivine-type $LiFePO_4$ or $Li_xFe_{1-y}M_yPO_4$ (wherein 0.05≤x≤1.2, 0≤y≤0.8, and M is at least one or more elements selected from Mn, Cr, Co, Cu, Ni, V, Mo, Ti, Zn, Al, Ga, Mg, B, and Nb). These materials can be used singly, or two or more kinds can be used as a mixture. The positive-electrode active material can also be an material that can reversibly extract and insert sodium ions, and examples of such material include an oxide represented by $NaM^1_aO_2$ such as $NaFeO_2$, $NaMnO_2$, $NaNiO_2$ or $NaCoO_2$, an oxide represented by $Na_{0.44}Mn_{1-a}M^1_aO_2$, or an oxide represented by $Na_{0.7}Mn_{1-a}M^1_aO_{2.05}$ ($M^1$ is one or more kinds of transition metal element, 0≤a<1); an oxide represented by $Na_bM^2_cSi_{12}O_{30}$ ($M^2$ is one or more kinds of transition metal element, 2≤b≤6, 2≤c≤5) such as $Na_6Fe_2Si_{12}O_{30}$ or $Na_2Fe_5Si_{12}O_{30}$; an oxide represented by $Na_dM^3_eSi_6O_{18}$ ($M^3$ is one or more kinds of transition metal element, 3≤d≤6, 1≤e≤2) such as $Na_2Fe_2Si_6O_{18}$ or $Na_2MnFeSi_6O_{18}$; an oxide represented by $Na_fM^4_gSi_2O_6$ ($M^4$ is one or more elements selected from a transition metal element, Mg, and Al, 1≤f≤2, 1≤g≤2) such as $Na_2FeSiO_6$; a phosphate such as $NaFePO_4$ or $Na_3Fe_2(PO_4)_3$; a borate such as $NaFeBO_4$ or $Na_3Fe_2(BO_4)_3$; or a fluoride represented by $Na_hM^5F_6$ ($M^5$ is one or more transition metal elements, 2≤h≤3) such as $Na_3FeF_6$ or $Na_2MnF_6$. These materials can be used singly, or two or more kinds can be used as a mixture.

The negative electrode 22 includes a negative-electrode current collector sheet 28, and a negative-electrode active material layer 26 formed on both surfaces of the negative-electrode current collector sheet 28. The negative electrode 22 can be formed as illustrated in FIGS. 8(a) and 8(b), for example. It can be formed by forming the negative-electrode active material layer 26 on both surfaces of the rectangular negative-electrode current collector sheet 28. The negative electrode 22 can be formed to have an electrode connection portion 23 that is connected to the negative-electrode current collector 4. The electrode connection portion 23 in FIG. 8(a) can be formed such that the negative-electrode active material layer 26 is not formed on both surfaces of the negative-electrode current collector sheet 28 at the end of the negative electrode 22. The electrode connection portion 23 can also be formed such that a lug portion similar to the above lug portion for the positive electrode 21 is formed on one end of the negative-electrode current collector sheet 28, and the negative-electrode active material layer 26 is not formed on the lug portion.

The negative-electrode current collector sheet 28 is not particularly limited, so long as it has an electric conduction property, and has the negative-electrode active material layer 26 formed on its surface. For example, a metal foil is used. Preferably, a copper foil is used.

The negative-electrode active material layer 26 can be formed on the negative-electrode current collector sheet 28 by adding a conductive agent or binder to a negative-electrode active material by a known method such as a coating method. The negative-electrode active material layer 26 can be formed to include particulate negative-electrode active materials and have porosity.

In the case of a lithium ion secondary battery, examples of the material for the negative-electrode active material include graphite, partially graphitized carbon, hard carbon, and $LiTiO_4$, and Sn and Si or their alloys. These materials can be used singly, or two or more kinds can be used as a mixture. In the case of a sodium ion secondary battery, examples of the material for the negative-electrode active material include graphite, partially graphitized carbon, and hard carbon. These materials can be used singly, or two or more kinds can be used as a mixture.

The negative electrode 22 includes the solid electrolyte interface film 35 on the surface of the negative-electrode active material 33. The solid electrolyte interface film 35 is an SEI (Solid Electrolyte Interface), for example. The SEI may be formed on the surface of the positive-electrode active material included in the positive electrode 21. In addition, the SEI formed on the surface of the positive-electrode active material preferably has a portion made of a component derived from a non-aqueous electrolyte solution substantially free of the flame retardant, and further, the SEI is preferably made of a component derived from a non-aqueous electrolyte solution substantially free of the flame retardant.

The negative electrode in the lithium ion secondary battery according to the present embodiment, which is an example of a non-aqueous electrolyte secondary battery, will be described. When the negative-electrode active material 33 is a graphite particle 32, the negative-electrode active material layer 26 has porosity, the non-aqueous electrolyte solution 5 is permeated into the pores in the negative-electrode active material layer 26, and the SEI 35 is formed on the surface of the graphite particle 32, the cross-section of the negative-electrode active material layer 26 is considered to become the one illustrated in FIG. 9.

Whether the SEI is formed on the surface of the negative-electrode active material 33 or not can be confirmed by analyzing the surface of the negative-electrode active material 33 with an atom force microscope (AFM), a scanning tunneling microscope (STM), or the like. The components of the SEI can be checked with a secondary ion mass spectrometry (SIMS), an X-ray photoelectron spectroscopy (XPS), an Auger electron spectroscopy (AES), or the like.

Although the structure of the SEI has not yet clearly been identified, covering the surface of the negative-electrode active material 33 or the surface of the positive-electrode active material with the SEI can prevent an excessive reaction between the electrode active material and the electrolyte solution, and therefore, can stabilize the charging and discharging characteristics of the lithium ion secondary battery 20.

The SEI is formed on the surface of the negative-electrode active material or on the surface of the positive-electrode active material with a decomposition of the electrolyte contained in the non-aqueous electrolyte solution around the surface of the electrode active material or the solvent of the non-aqueous electrolyte solution, or a reaction between the solvent and lithium ions, which are side reactions upon charging the lithium ion secondary battery, especially upon a first charging of the electrode (pre-charging in the embodiment of the present invention). Therefore, the SEI is composed of a component derived from the non-aqueous electrolyte solution around the surface of the electrode active material. Accordingly, when the non-aqueous electrolyte solution around the surface of the electrode active material upon the formation of the SEI contains cyclic/chain carbonates such as EC, PC, DEC, or DMC, Li salt, flame retardant, or vinylene carbonate (VC), the SEI formed by using this non-aqueous electrolyte solution as a raw material is considered to include these components or the components generated by the chemical reaction of these components. Accordingly, when the non-aqueous electrolyte solution around the surface of the electrode active material upon the formation of the SEI contains a flame retardant, the SEI is considered to contain the flame retardant or a component generated by the chemical reaction of the flame retardant. When the non-aqueous electrolyte solution around the surface of the electrode active material upon the formation of the SEI does not contain a flame retardant, the SEI is not considered to contain the flame retardant or a component generated by the chemical reaction of the flame retardant.

It is considered that the SEI is formed on the surface of the electrode active material mainly upon the first charging of the electrode (pre-charging in the embodiment of the present invention). However, when the lithium ion secondary battery is repeatedly charged and discharged, the SEI is damaged and deteriorated, though little by little. The deteriorated portion of the SEI is newly reproduced with the non-aqueous electrolyte solution around the surface of the electrode active material as a raw material. For the reproduction, supporting electrolyte salts, electrolyte solution, additive agents, and the like are consumed. Specifically, it is conceivable that, during a long-term use of the battery, ion species for moving charges or the amount of the electrolyte solution are decreased, and therefore, the characteristics of the battery are deteriorated with its operating time.

It is considered that the speed of the deterioration of the SEI is determined by quality of the SEI. The SEI is composed of the component derived from the non-aqueous electrolyte solution, and it is a polymer in which carbonate-derived structures are linked. When a structure derived from an impurity such as a flame retardant is inserted therein, it is considered that the structure of the SEI is disordered to deteriorate the quality. In light of this, with the electrolyte solution containing a flame retardant, it is considered that a structure derived from the flame retardant is inserted into the SEI, and this deteriorates the quality of the SEI and accelerates the deterioration of the SEI. Especially, it is conceivable that, if the quality of the SEI initially formed is excellent, deterioration is difficult to occur, and impurities are difficult to be inserted during the reproduction, and therefore, more effective result will be produced.

It is considered that the SEI forming reaction is carried out in an electrolyte solution containing no flame retardant in order to enhance the quality of the SEI. Especially, since the SEI is formed most often upon the first charging of the electrode, it is more effective to enhance the quality of the SEI formed upon the first charging of the electrode.

The SEI 35 on the negative-electrode active material 33 included in the negative electrode 22 of the lithium ion secondary battery 20 according to the present embodiment has a portion composed of a component derived from a non-aqueous electrolyte solution 5b substantially free of the flame retardant. Therefore, the concentration of the flame retardant or the concentration of the component produced by the chemical reaction of the flame retardant contained in the SEI 35 becomes lower than that of the SEI formed by using the non-aqueous electrolyte solution containing a flame retardant dissolved therein as a raw material.

The SEI 35 may be formed to include a portion composed of a component derived from the non-aqueous electrolyte solution 5b substantially free of the flame retardant and to partly include a portion composed of a component derived from the non-aqueous electrolyte solution 5b substantially containing a flame retardant. However, it is preferable that the SEI 35 is made of only the portion composed of a component derived from the non-aqueous electrolyte solution 5b substantially free of the flame retardant.

Whether or not the SEI 35 has the portion composed of the component derived from the non-aqueous electrolyte solution 5b substantially free of the flame retardant can be checked as follows. Specifically, a component of an SEI on a negative-electrode active material in a lithium ion secondary battery to be tested is checked, and then, the analysis result of this component, an analysis result of a component of an SEI composed of only a component derived from a non-aqueous electrolyte solution free of flame retardant, and an analysis result of a component of an SEI composed of only a component derived from a non-aqueous electrolyte solution containing a flame retardant dissolved therein are compared.

Next, a method for producing a non-aqueous electrolyte secondary battery 20 in which a solid electrolyte interface film having a portion composed of a component derived from a non-aqueous electrolyte solution substantially free of the flame retardant is formed on a surface of a positive-electrode active material or a negative-electrode active material 33 will be described. FIGS. 10 and 11 are process diagrams of the method for producing the non-aqueous electrolyte secondary battery according to the present embodiment.

The method for producing the non-aqueous electrolyte secondary battery 20 according to the present embodiment includes a step of placing the electrode body 12 into the outer casing 17, the electrode body 12 having a folded-separator structure or a wound structure in which the positive electrode 21 including a positive-electrode active material and the negative electrode 22 including a negative-electrode active material are stacked with the separator 24 interposed therebetween; a step of placing a non-aqueous electrolyte free of a flame retardant into the outer casing 17; a step of charging the electrode body by applying a voltage between the positive electrode 21 and the negative electrode 22 placed in the outer casing 17; a step of placing a flame retardant into the outer casing 17; and a step of sealing the outer casing 17, wherein the step of charging is a step of charging the electrode body with the state in which the surface of the positive-electrode active material and the surface of the negative-electrode active material are in contact with the non-aqueous electrolyte substantially free of the flame retardant.

The order of a plurality of steps included in the method for producing according to the present embodiment is optional, unless otherwise inconsistent.

The state in which the surface of the positive-electrode active material included in the positive electrode 21 and the surface of the negative-electrode active material 33 included in the negative electrode are in contact with the non-aqueous electrolyte solution 5 substantially free of the flame retardant is formed in the outer casing 17, whereby the non-aqueous electrolyte solution 5 around the surface of the positive-electrode active material and the non-aqueous electrolyte solution 5 around the surface of the negative-electrode active material 33 can be the non-aqueous electrolyte solution 5 substantially free of the flame retardant. When charging is performed with this state with an application of a voltage between the positive electrode 21 and the negative electrode 22, a solid electrolyte interface film composed of a component derived from the non-aqueous electrolyte solution 5 substantially free of the flame retardant can be formed on the surface of the positive-electrode active material or the negative-electrode active material 33.

For example, as illustrated in the step A in FIG. 10, the electrode body 12 produced by stacking the positive electrode 21 and the negative electrode 22 via the separator 24 is fixed to the lid member 2, and the electrode body 12 is stored in the battery case 1. Thereafter, as illustrated in the step B in FIG. 10, the non-aqueous electrolyte solution 5b free of flame retardant is injected into the battery case 1 through the first inlet 40 to allow the lower part of the electrode body 12 to be dipped in the non-aqueous electrolyte solution 5b. The amount of the non-aqueous electrolyte solution injected into the battery case 1 is not particularly limited. However, the amount is preferably equal to or larger than the amount by which the entire surface of the positive-electrode active material in the positive-electrode active material layer 25 and the entire surface of the negative-electrode active material in the negative-electrode active material layer 26 are brought into contact with the non-aqueous electrolyte solution 5b free of flame retardant due to a capillary action. For example, the amount can be set such that about a half of the battery case 1 is filled with the non-aqueous electrolyte solution 5b.

When this state is kept for a certain period of time, the non-aqueous electrolyte solution 5b is permeated into the positive-electrode active material layer 25 and the negative-electrode active material layer 26 due to the capillary action, and this can form the state in which the surface of the positive-electrode active material and the surface of the negative-electrode active material are brought into contact with the non-aqueous electrolyte solution 5b free of flame retardant. In the present embodiment, the non-aqueous electrolyte solution 5b is injected into the battery case 1 after the electrode body 12 is placed into the battery case 1. However, the electrode body 12 may be placed into the battery case 1 after the non-aqueous electrolyte solution 5b is injected into the battery case 1.

After the non-aqueous electrolyte solution 5b is permeated into the positive-electrode active material layer 25 and the negative-electrode active material layer 26, the non-aqueous electrolyte solution 5a containing a flame retardant dissolved therein is injected into the battery case 1 through the second inlet 41 as illustrated in the step C in FIG. 10. The flame retardant concentration in the injected non-aqueous electrolyte solution 5a can be set relatively high.

Thereafter, the first inlet 40 is closed by the first sealing member 42, and the second inlet 41 is closed by the second sealing member 43, whereby the outer casing 17 can be sealed. Thus, the non-aqueous electrolyte secondary battery can be produced. It is to be noted that the step of sealing the outer casing 17 may be performed after later-described pre-charging.

In the produced battery, the non-aqueous electrolyte solution 5b free of flame retardant is permeated into the positive-electrode active material layer 25 and the negative-electrode active material layer 26 before the non-aqueous electrolyte solution 5a containing a flame retardant dissolved therein is injected into the battery case 1. With this, the flame retardant can hardly be permeated into the positive-electrode active material layer 25 and the negative-electrode active material layer 26, and therefore, the surface of the positive-electrode active material and the surface of the negative-electrode active material keep in contact with the non-aqueous electrolyte solution 5 substantially free of the flame retardant. Then, as illustrated in the step D in FIG. 10, a voltage is applied between the positive electrode 21 and the negative electrode 22 with this state to perform pre-charging. With this, a solid electrolyte interface film composed of a component derived from the non-aqueous electrolyte solution substantially free of the flame retardant can be formed on the surface of the positive-electrode active material or the negative-electrode active material 33.

In the present embodiment, the step of performing pre-charging (step D) is carried out after the step (step C) of injecting the non-aqueous electrolyte solution 5b free of flame retardant into the battery case 1. However, the order of these two steps may be reversed.

Notably, before the injection of the non-aqueous electrolyte solution 5a containing a flame retardant dissolved therein into the battery case 1, a portion of the non-aqueous electrolyte solution 5b in the battery case 1 may be removed to control the amount of the non-aqueous electrolyte solution 5.

In the present embodiment, the non-aqueous electrolyte solution 5a containing a flame retardant dissolved therein is injected into the battery case 1. However, a flame retardant may be directly injected into the battery case 1. A flame retardant may be injected into the battery case 1 containing the non-aqueous electrolyte solution 5, and the flame retardant may be dissolved in the non-aqueous electrolyte solution 5 in the battery case 1. If the flame retardant is not quickly dissolved in the non-aqueous electrolyte solution 5a, the flame retardant may be injected into the battery case 1 before the electrode body 12 is placed into the battery case 1 or before the non-aqueous electrolyte solution 5b free of flame retardant is injected into the battery case 1. Such modification can similarly be applied to a method for producing described later.

In the case where the non-aqueous electrolyte solution 5b free of flame retardant is permeated into the electrode body 12 as described above, the non-aqueous electrolyte solution 5b free of flame retardant is permeated and retained in the positive-electrode active material layer 25, the negative-electrode active material layer 26, and the separator 24, and between the separator 24 and the positive electrode 21 and between the separator 24 and the negative electrode 22.

The non-aqueous electrolyte solution 5 retained in the electrode body 12 is difficult to move. Therefore, even when the non-aqueous electrolyte solution 5a containing a flame retardant dissolved therein is injected at the outside of the electrode body 12 retaining the non-aqueous electrolyte solution 5, the flame retardant is difficult to be flown and to be diffused in the non-aqueous electrolyte solution 5 in the electrode body 12, resulting in that a difference in the flame retardant concentration occurs between the non-aqueous electrolyte solution 5 in the electrode body 12 and the non-aqueous electrolyte solution 5 outside the electrode body 12. Since the non-aqueous electrolyte solution 5a containing a flame retardant dissolved therein has higher viscosity than the non-aqueous electrolyte solution 5b free of flame retardant, the flame retardant is difficult to be inserted into the electrode body 12.

In addition, as illustrated in the step A in FIG. 11, the electrode body 12 produced by stacking the positive electrode 21 and the negative electrode 22 via the separator 24 is fixed to the lid member 2, and the electrode body 12 is stored in the battery case 1. Thereafter, as illustrated in the step B in FIG. 11, the non-aqueous electrolyte solution 5b free of flame retardant is injected into the battery case 1 to allow substantially the whole electrode body 12 to be dipped in the non-aqueous electrolyte solution 5b. With this, the non-aqueous electrolyte solution 5b is permeated into the positive-electrode active material layer 25 and the negative-electrode active material layer 26 and this can form the state in which the surface of the positive-electrode active material and the surface of the negative-electrode active material 33 are brought into contact with the non-aqueous electrolyte solution 5b free of flame retardant. In the present embodiment, the non-aqueous electrolyte solution 5b is injected into the battery case 1 after the electrode body 12 is placed into the battery case 1. However, the electrode body 12 may be placed into the battery case 1 after the non-aqueous electrolyte solution 5b is injected into the battery case 1. In addition, in the present embodiment, the non-aqueous electrolyte solution 5b is injected until the whole electrode body 12 is dipped into the non-aqueous electrolyte solution 5b. However, it is only necessary that the entire surface of the positive-electrode active material in the positive-electrode active material layer 25 and the entire surface of the negative-electrode active material in the negative-electrode active material layer 26 are brought into contact with the non-aqueous electrolyte solution 5b free of flame retardant due to a capillary action. For example, the non-aqueous electrolyte solution 5b may be injected until more than a half of the electrode body 12 is dipped into the non-aqueous electrolyte solution 5b, and the non-aqueous electrolyte solution 5b may be permeated into the positive-electrode active material layer 25 and the negative-electrode active material layer 26 with the capillary action. In this case, the step of removing the non-aqueous electrolyte solution 5b described later can be skipped.

Then, as illustrated in the step C in FIG. 11, a voltage is applied between the positive electrode 21 and the negative electrode 22 with this state to perform pre-charging. With this, a solid electrolyte interface film composed of a component derived from the non-aqueous electrolyte solution substantially free of the flame retardant can be formed on the surface of the positive-electrode active material or the negative-electrode active material 33. After the solid electrolyte interface film is formed, the non-aqueous electrolyte solution 5b in the battery case 1 is removed as illustrated in the step D in FIG. 11, and then, the non-aqueous electrolyte solution 5a containing a flame retardant dissolved therein is injected into the battery case 1 as illustrated in the step E in FIG. 11. Thus, the non-aqueous electrolyte secondary battery can be produced.

In the present embodiment, the non-aqueous electrolyte solution 5b in the battery case 1 is substantially all removed. However, some of the non-aqueous electrolyte solution 5b used for pre-charging may be left. For example, about a half of the non-aqueous electrolyte solution 5b in the battery case 1 may be removed. In this case, the non-aqueous electrolyte solution 5a having relatively high flame retardant concentration can be injected into the battery case 1.

In the present embodiment, the non-aqueous electrolyte solution 5b in the battery case 1 is removed, and the non-aqueous electrolyte solution 5a is injected. However, a flame retardant may directly be injected into the non-aqueous electrolyte solution 5b in the battery case 1 without performing these two steps. A flame retardant is injected after pre-charging. However, pre-charging may be performed after the flame retardant is injected. In addition, the sealing step may be performed before or after the charging step.

In the non-aqueous electrolyte secondary battery produced with the processes described above, the solid electrolyte interface film composed of a component derived from the non-aqueous electrolyte solution substantially free of the flame retardant is formed upon pre-charging. With this, the solid electrolyte interface film can be formed to have excellent quality. This can prevent the deterioration in the quality of the solid electrolyte interface film and the acceleration in the deterioration of the solid electrolyte interface film, which are caused because the component derived from the flame retardant is inserted into the solid electrolyte interface film. Accordingly, the reduction in the battery capacity can be suppressed, even if the non-aqueous electrolyte secondary battery is used to be repeatedly charged and discharged. Consequently, life characteristics such as cycle characteristics and floating charge characteristics can be enhanced. Since the non-aqueous electrolyte solution 5 in the battery case 1 contains a flame retardant, a flash point of the non-aqueous electrolyte solution 5 is high. With this, safety of the non-aqueous electrolyte secondary battery can be enhanced. In addition, it is considered that high quality of the solid electrolyte interface film can suppress consumption of the flame retardant in the non-aqueous electrolyte solution. Accordingly, the reduction in the concentration of the flame retardant in the non-aqueous electrolyte solution caused by the repeated charging and discharging can be suppressed. With this, safety of the non-aqueous electrolyte secondary battery can further be enhanced.

A part of the solid electrolyte interface film formed first is considered to be damaged due to charging and discharging of the non-aqueous electrolyte secondary battery. The solid electrolyte interface film is newly formed on this damaged portion from the non-aqueous electrolyte solution 5 upon the subsequent charging. In the case where the newly formed solid electrolyte interface film is in contact with the non-aqueous electrolyte solution containing a flame retardant dissolved therein, it might be composed of a component derived from the non-aqueous electrolyte solution containing a flame retardant dissolved therein. However, it is considered that most of the solid electrolyte interface film formed first remains on the surface of the positive-electrode active material or the negative-electrode active material, and that the flame retardant component is difficult to be inserted into the solid electrolyte interface film. Therefore, it is considered that the solid electrolyte interface film composed of a component derived from the non-aqueous electrolyte solution containing a flame retardant dissolved therein becomes very small.

It is also considered that the flow and diffusion of the flame retardant into the non-aqueous electrolyte solution in the electrode body are suppressed, and therefore, the concentration does not soon reach the concentration in the non-aqueous electrolyte solution outside the electrode body. Accordingly, it is considered that the solid electrolyte interface film composed of a component derived from the non-aqueous electrolyte solution containing a flame retardant dissolved therein becomes very small. As described above, even if the solid electrolyte interface film is reproduced, a speed of deterioration in quality can be reduced, whereby the deterioration in the life characteristics of the non-aqueous electrolyte secondary battery can be prevented.

A non-aqueous electrolyte secondary battery in which a solid electrolyte interface film having a portion composed of a component derived from a non-aqueous electrolyte solution substantially free of the flame retardant is formed on a surface of a positive-electrode active material or a negative-electrode active material can also be produced with the method described below. FIGS. 12 and 13 are process diagrams of the method for producing the non-aqueous electrolyte secondary battery according to the reference embodiments.

For example, as illustrated in the step A in FIG. 12, the electrode body 12 formed by stacking the positive electrode 21 and the negative electrode 22 via the separator 24 is fixed to the lid member 2, and then, this electrode body 12 is dipped into the non-aqueous electrolyte solution 5b, which is substantially free of the flame retardant and stored in a pretreatment container 37. With this, the non-aqueous electrolyte solution 5b stored in the pretreatment container 37 can be permeated into the positive-electrode active material layer 25 and the negative-electrode active material layer 26, and this can form a state in which the surface of the positive-electrode active material and the surface of the negative-electrode active material 33 are brought into contact with the non-aqueous electrolyte solution 5b substantially free of the flame retardant. As illustrated in the step A in FIG. 12, a voltage is applied between the positive electrode 21 and the negative electrode 22 with this state to perform pre-charging. With this, a solid electrolyte interface film composed of a component derived from the non-aqueous electrolyte solution 5b substantially free of the flame retardant can be formed on the surface of the positive-electrode active material or the negative-electrode active material 33. After the formation of the solid electrolyte interface film, the electrode body 12 removed from the pretreatment container 37 is accommodated into the battery case 1 as illustrated in the step B in FIG. 12, and then, the non-aqueous electrolyte solution 5a containing a flame retardant dissolved therein is injected into the battery case 1 as illustrated in the step C in FIG. 12. Thus, the non-aqueous electrolyte secondary battery can be produced.

Alternatively, as illustrated in the step A in FIG. 13, for example, the electrode body 12 formed by stacking the positive electrode 21 and the negative electrode 22 via the separator 24 is fixed to the lid member 2, and then, this electrode body 12 is dipped into the non-aqueous electrolyte solution 5b, which is substantially free of the flame retardant and stored in the pretreatment container 37. With this, the non-aqueous electrolyte solution 5b stored in the pretreatment container 37 can be permeated into the positive-electrode active material layer 25 and the negative-electrode active material layer 26, and this can form a state in which the surface of the positive-electrode active material and the surface of the negative-electrode active material 33 are brought into contact with the non-aqueous electrolyte solution 5b substantially free of the flame retardant. After the non-aqueous electrolyte solution 5b is permeated into the positive-electrode active material layer 25 and the negative-electrode active material layer 26, the electrode body 12 removed from the pretreatment container 37 is accommodated into the battery case 1 as illustrated in the step B in FIG. 13, and then, the non-aqueous electrolyte solution 5a containing a flame retardant dissolved therein is injected into the battery case 1 as illustrated in the step C in FIG. 13. Thus, the non-aqueous electrolyte secondary battery can be produced. In this case, before the non-aqueous electrolyte solution 5a containing a flame retardant dissolved therein is injected into the battery case 1, the non-aqueous electrolyte solution 5b free of flame retardant is permeated into the positive-electrode active material layer 25 and the negative-electrode active material layer 26. With this, the flame retardant can hardly be permeated into the positive-electrode active material layer 25 and the negative-electrode active material layer 26, and therefore, the surface of the positive-electrode active material and the surface of the negative-electrode active material 33 keep in contact with the non-aqueous electrolyte solution 5 substantially free of the flame retardant. Then, as illustrated in the step D in FIG. 13, a voltage is applied between the positive electrode 21 and the negative electrode 22 with this state to perform pre-charging. With this, a solid electrolyte interface film composed of a component derived from a non-aqueous electrolyte solution substantially free of the flame retardant can be formed on the surface of the positive-electrode active material or the negative-electrode active material.

Additionally, a pre-doping method has been known as a method which can form a solid electrolyte interface film. Taking a lithium ion battery as an example, a lithium thin plate is attached to an electrode active material, or lithium metal powders are mixed in the electrode active material layer, to dope lithium ions into the electrode active material, with the pre-doping method. It has been known that a solid electrolyte interface film derived from an electrolyte solution is formed with this method.

3. Positive-Electrode Current Collector, Negative-Electrode Current Collector

The positive-electrode current collector 3 is a member electrically connecting the positive electrode 21 included in the electrode body 12 to an external connection terminal 8a.

The negative-electrode current collector 4 is a member electrically connecting the negative electrode 22 included in the electrode body 12 to an external connection terminal 8b.

The current collector 7 (the positive-electrode current collector 3 or the negative-electrode current collector 4) has a plate-like base portion fixed to the outer casing 17 and a plate-like leg portion extending from the base portion. The current collector 7 can also be configured to include a projection portion 31 projecting from the base portion and penetrating through the opening formed on the lid member 2.

The materials of the positive-electrode current collector 3 and the negative-electrode current collector 4 are not particularly limited. For example, the positive-electrode current collector 3 can be made of aluminum, and the negative-electrode current collector 4 can be made of copper.

A method for producing the positive-electrode current collector 3 and the negative-electrode current collector 4 is not particularly limited. For example, they can be produced by press working of a metal plate. A metal plate having a thickness of 1.5 mm or more and 2.5 mm or less can be used for the metal plate.

The base portion of the positive-electrode current collector 3 and the base portion of the negative-electrode current collector 4 can be fixed to the lid member 2. The method of fixing the base portion of the current collector is not particularly limited, so long as the base portion can be fixed such that the positive-electrode current collector 3 or the negative-electrode current collector 4 can be connected to an external wiring. For example, the base portion can be fixed as illustrated in the sectional view of FIG. 3. In the non-aqueous electrolyte secondary battery 20 illustrated in FIG. 3, the projection portion 31 of the current collector 7 is inserted into the opening of the lid member 2 and the opening of the external connection terminal 8, and the projection portion 31 is caulked to form the current collector 7, the lid member 2, and the external connection terminal 8 integral with one another. With this configuration of the non-aqueous electrolyte secondary battery 20, the current collector 7 can be fixed to the lid member 2 with the current collector 7 being electrically connected to the external connection terminal 8. Thus, the non-aqueous electrolyte secondary battery 20 can be charged and discharged via the external connection terminals 8a and 8b.

In the non-aqueous electrolyte secondary battery 20 illustrated in FIG. 3, an internal insulating member 11 is provided between the inside of the lid member 2 and the current collector 7, while an external insulating member 10 is provided between the outside of the lid member 2 and the external connection terminal 8. In addition, a packing 13 is provided between the opening of the lid member 2 and the projection portion 31. This configuration of the non-aqueous electrolyte secondary battery 20 can prevent the leak current from flowing through the lid member 2. This configuration can also prevent the electrolyte solution 5 from leaking from the opening of the lid member 2.

In the non-aqueous electrolyte secondary battery 20 illustrated in FIG. 3, the internal insulating member 11, the external insulating member 10, and the packing 13 are formed integral with the current collector 7, the lid member 2, and the external connection terminal 8.

The leg portion of the current collector 7 has a shape in which the end of the base portion extends to project from the base portion. The leg portion may have a rod-like shape or a plate-like shape. The leg portion may be formed simultaneous with the current collector 7 by processing a single metal plate, or may be formed by bonding another metal plate to the base portion.

It is only necessary that at least one leg portion is formed to one base portion. However, two or more leg portions may also be formed. The leg portion may be branched.

The leg portion has a connection portion to which the electrode (positive electrode 21 or the negative electrode 22) is connected and a curved portion formed between the base portion and the connection portion.

The electrode connection portion 23 of the positive electrode 21 is connected to the connection portion of the positive-electrode current collector 3, while the electrode connection portion 23 of the negative electrode 22 is connected to the connection portion of the negative-electrode current collector 4. Due to the connection portion of the current collector, the contact area between the positive-electrode current collector 3 and the positive electrode 21 or between the negative-electrode current collector 4 and the negative electrode 22 can be increased, whereby a conductive resistance can be reduced.

The configuration in which the connection portion is formed enables the connection with the current collector 7 without bending the electrode plate of the electrode body 12, and this can prevent excessive force from being applied to the electrode body 12.

The method of bonding the electrode connection portion 23 to the connection portion includes ultrasonic welding, spot welding, and laser welding, for example.

A plurality of electrode connection portions 23 of the positive electrodes 21 can be connected to the connection portion of the positive-electrode current collector 3, and a plurality of electrode connection portions 23 of the negative electrodes 22 can be connected to the connection portion of the negative-electrode current collector 4. In this case, a plurality of electrode connection portions 23 can be connected to the electrode connection portion 23 of the current collector 7 as superimposed.

4. Shrink Tube

The non-aqueous electrolyte secondary battery 20 can be provided with the shrink tube 15 that bundles the electrode body 12, the positive-electrode current collector 3, and the negative-electrode current collector 4 together.

The shrink tube 15 is made of a tube-shaped resin film, and bundles the electrode body 12, the positive-electrode current collector 3, and the negative-electrode current collector 4 together by thermal shrinkage. The shrink tube 15 also covers the electrode body 12, the positive-electrode current collector 3, and the negative-electrode current collector 4.

The shrink tube 15 may have a heat-sealed seam joint or may be a seamless tube having no seam joint. The shrink tube 15 is capable of suppressing bulges or displacement of the electrode body 12 and of preventing the positive electrodes 21 and the negative electrodes 22 in the electrode body 12 to be separated from each other. Especially in the case where the electrode body 12 has a stack structure, the shrink tube 15 functions as a component for fixing the positive electrodes 21 and the negative electrodes 22 or as a member for maintaining a shape of the electrode body 12.

A material for the film constituting the shrink tube 15 is a thermally shrinkable resin such as polyethylene, polypropylene, polyolefin, polyvinyl chloride (PVC), polyethylene terephthalate (PET), or a fluorinated resin (such as FEP or PTFE). The thermally shrunken tube 15 is capable of increasing closeness of the encompassed positive-electrode current collector 3, negative-electrode current collector 4, and electrode body 12 by bundling the positive-electrode current collector 3, the negative-electrode current collector 4, and the electrode body 12 together, with the result that the thermally shrunken tube is capable of suppressing effects on junctions between the electrode body 12 and the current collectors caused by vibrations applied to the lithium ion battery. The film constituting the shrink tube 15 may be 30 μm or more to 200 μm or less in thickness.

Charging-Discharging Cycle Test of Lithium Ion Secondary Battery Serving as Non-Aqueous Electrolyte Secondary Battery The electrode body 12 illustrated in FIG. 6 was assembled by using the positive electrodes 21 using lithium iron phosphate as a positive-electrode active material, the negative electrodes 22 using graphite as a negative-electrode active material, and the separator 24. The separator 24 was folded in zigzag. The positive electrode 21 and the negative electrode 22 were disposed in valley folds of the separator 24, and each of the positive electrodes 21 and each of the negative electrodes 22 were disposed alternately with the separator interposed therebetween. The separator was disposed to completely cover the electrode active material layers, and taped at its end. Thereafter, the ends of the positive electrodes 21 were simultaneously welded to the positive-electrode current collector 3 fixed to the lid member 2, and the ends of the negative electrodes 22 were simultaneously welded to the negative-electrode current collector 4 fixed to the lid member 2. Then, the electrode body 12, the positive-electrode current collector 3, and the negative-electrode current collector 4 were fixed with the shrink tube 15. Thereafter, the electrode body 12 and the non-aqueous electrolyte solution 5 were placed in the battery case 1. Thus, the lithium ion secondary battery illustrated in FIGS. 1 to 5 was produced.

Under the condition in which a pre-charging method was changed or an amount of a flame retardant in the used non-aqueous electrolyte solution was changed, five different lithium ion secondary batteries A to E were prepared.

As illustrated in FIG. 12, the battery A as a reference example 1 was pre-charged in the state in which the electrode body 12 already fixed with the shrink tube 15 was placed into the non-aqueous electrolyte solution 5b, which was stored in the pretreatment container 37 and did not contain a flame retardant, to allow the electrode body 12 to retain the non-aqueous electrolyte solution 5b. The used non-aqueous electrolyte solution 5b was prepared by mixing 1.5 mol/L of $LiPF_6$ serving as a supporting salt and 1 wt % of VC as an additive agent into a solvent of EC:DEC:EMC=3:6:1. The pre-charging was conducted for 30 minutes at room temperature and 0.4 C.

The electrode body 12 that was already pre-charged was removed from the non-aqueous electrolyte solution 5b stored in the pretreatment container 37, placed into the battery case 1, and sealed. Then, a solution prepared by adding 1.5 mol/L of $LiPF_6$ as a supporting electrolyte salt, 1 wt % of VC as an additive agent, and ethoxy pentafluoro cyclophosphazene as a flame retardant to a solvent of EC:DEC:EMC=3:6:1 as the non-aqueous electrolyte solution 5a containing a flame retardant dissolved therein was injected into the battery case 1 such that the flame retardant concentration in the electrolyte solution in the battery case 1 became 6 wt %. Thus, the battery A was produced.

The pre-charging was performed to the battery A with the state in which the non-aqueous electrolyte solution 5b free of flame retardant was in contact with the surface of the positive-electrode active material and the surface of the negative-electrode active material. Therefore, it is considered that a solid electrolyte interface film free of a component derived from a flame retardant is formed on the surface of the positive-electrode active material or the negative-electrode active material.

In the battery B as an example 1, the electrode body 12 already fixed with the shrink tube 15 was placed into the battery case 1, and this battery case 1 was sealed with the lid member 2. Thereafter, a non-aqueous electrolyte solution 5b prepared by mixing 1.5 mol/L of $LiPF_6$ serving as a supporting electrolyte salt and 1 wt. % of VC as an additive agent into a solvent of EC:DEC:EMC=3:6:1 without containing a flame retardant was injected into the battery case 1 to a half of the whole volume of the non-aqueous electrolyte solution to be injected into the battery case 1. The pre-charging was conducted with the non-aqueous electrolyte solution 5b being retained by the electrode body 12. The pre-charging was conducted for 30 minutes at room temperature and 0.4 C. After the pre-charging, a solution prepared by adding 1.5 mol/L of $LiPF_6$ as a supporting electrolyte salt, 1 wt % of VC as an additive agent, and ethoxy pentafluoro cyclophosphazene as a flame retardant to a solvent of EC:DEC:EMC=3:6:1 as the non-aqueous electrolyte solution 5a containing a flame retardant dissolved therein was injected into the battery case 1 such that the flame retardant concentration in the electrolyte solution 5 in the battery case 1 became 6 wt %. Thus, the battery B was produced.

The battery B was pre-charged with the state in which the non-aqueous electrolyte solution 5b substantially free of the flame retardant was in contact with the surface of the positive-electrode active material and the surface of the negative-electrode active material. Therefore, it is considered that the solid electrolyte interface film free of a component derived from a flame retardant is formed on the surface of the positive-electrode active material or the negative-electrode active material.

In the battery E as an example 2, the electrode body 12 already fixed with the shrink tube 15 was placed into the battery case 1, and this battery case 1 was sealed with the lid member 2 as illustrated in FIG. 10. Thereafter, a non-aqueous electrolyte solution 5b prepared by mixing 1.5 mol/L of $LiPF_6$ serving as a supporting electrolyte salt and 1 wt % of VC as an additive agent into a solvent of EC:DEC:EMC=3:6:1 without containing a flame retardant was injected into the battery case 1 to a half of the whole volume of the non-aqueous electrolyte solution to be injected into the battery case 1 to allow the electrode body 12 to retain the non-aqueous electrolyte solution 5b. After the non-aqueous electrolyte solution 5b is sufficiently permeated into the electrode body 12, a solution prepared by adding 1.5 mol/L of $LiPF_6$ as a supporting electrolyte salt, 1 wt % of VC as an additive agent, and ethoxy pentafluoro cyclophosphazene as a flame retardant to a solvent of EC:DEC:EMC=3:6:1 as the non-aqueous electrolyte solution 5a containing a flame retardant dissolved therein was injected into the battery case 1. Just after the injection, pre-charging was conducted for 30 minutes at room temperature and 0.4 C. Thus, the battery E was produced. The non-aqueous electrolyte solution 5a was adjusted such that the flame retardant concentration became 6 wt % when the flame retardant concentration in the non-aqueous electrolyte solution 5 in the battery case 1 became uniform.

In the battery E, the non-aqueous electrolyte solution 5b was sufficiently permeated into the electrode body 12 before the injection of the non-aqueous electrolyte solution 5a. With this, the surface of the positive-electrode active material and the surface of the negative-electrode active material were in contact with the non-aqueous electrolyte solution substantially free of the flame retardant during the pre-charging. Therefore, it is considered that a solid electrolyte interface film free of a component derived from a flame retardant is formed on the surface of the positive-electrode active material or the negative-electrode active material by the pre-charging.

In the battery C as a comparative example 1, the electrode body 12 already fixed with the shrink tube 15 was placed into the battery case 1, and this battery case 1 was sealed with the lid member 2. Then, a solution prepared by adding 1.5 mol/L of $LiPF_6$ as a supporting electrolyte salt, 1 wt % of VC as an additive agent, and ethoxy pentafluoro cyclophosphazene as a flame retardant to a solvent of EC:DEC:EMC=3:6:1 as the non-aqueous electrolyte solution 5a containing a flame retardant dissolved therein was injected into the battery case 1. Pre-charging was performed to produce the battery C. The pre-charging was conducted for 30 minutes at room temperature and 0.4 C.

The pre-charging was performed to the battery C with the state in which the non-aqueous electrolyte solution containing a flame retardant was in contact with the surface of the positive-electrode active material and the surface of the negative-electrode active material. Therefore, it is considered that a solid electrolyte interface film containing a component derived from a flame retardant is formed on the surface of the positive-electrode active material or the negative-electrode active material.

In the battery D as a comparative example 2, the electrode body 12 already fixed with the shrink tube 15 was placed into the battery case 1, and this battery case 1 was sealed with the lid member 2. Then, a solution prepared by adding 1.5 mol/L of $LiPF_6$ as a supporting electrolyte salt and 1 wt % of VC as an additive agent to a solvent of EC:DEC:EMC=3:6:1 as the non-aqueous electrolyte solution 5b free of flame retardant was injected into the battery case 1. Pre-charging was performed to produce the battery D. The pre-charging was conducted for 30 minutes at room temperature and 0.4 C.

The pre-charging was performed to the battery D with the state in which the non-aqueous electrolyte solution free of flame retardant was in contact with the surface of the positive-electrode active material and the surface of the negative-electrode active material. Therefore, it is considered that a solid electrolyte interface film substantially free of a component derived from a flame retardant is formed on the surface of the positive-electrode active material or the negative-electrode active material. However, the whole non-aqueous electrolyte solution 5 in the battery case 1 does not contain a flame retardant, so that a flash point of the non-aqueous electrolyte solution 5 is considered to be low.

A charging-discharging test was performed to the produced batteries A to D. In the test, the temperature of each battery was held at 50° C., and with this state, the battery was charged to 3.50 V with a current value of 1 CA. After reaching 3.50 V, the battery was held with this voltage for 90 minutes. Thereafter, about a ten-minute interval was formed, and then, the battery was discharged to 2.0 V with a current value of 1 CA. After the battery reached 2.0 V, about a ten-minute interval was formed, and then, the battery was again charged to 3.50 V with a constant current with a current value of 1 CA. 300 cycles of the charging-discharging test described above were performed for each of the batteries A to D, and the battery capacity was measured.

FIG. 14 illustrates the measurement result of the charging-discharging cycle test. In FIG. 14, the battery capacity is shown as a capacity retention rate (%) with the battery capacity in the first charging-discharging cycle being defined as 100%.

The measurement result of the battery C according to the comparative example 1 in FIG. 14 shows that the capacity retention rate was gradually reduced with the repeated charging-discharging cycles, and the battery capacity after 300 cycles was lower than the battery capacity in the first charging-discharging cycle by about 12.5%. It is considered that the reduction in the capacity retention rate was large because the solid electrolyte interface film containing a component derived from a flame retardant was formed on the surface of the positive-electrode active material or the negative-electrode active material in the battery C.

The measurement result of the battery D according to the comparative example 2 in FIG. 14 shows that the capacity retention rate was gradually reduced with the repeated charging-discharging cycles, and the battery capacity after 300 cycles was lower than the battery capacity in the first charging-discharging cycle by about 9%. It is considered that the reduction in the capacity retention rate was suppressed because the solid electrolyte interface film free of a component derived from a flame retardant was formed on the surface of the positive-electrode active material or the negative-electrode active material in the battery D. Notably, the non-aqueous electrolyte solution in the battery D does not contain a flame retardant.

The measurement result of the battery A according to the reference example 1 in FIG. 14 shows that the capacity retention rate was gradually reduced with the repeated charging-discharging cycles, and the battery capacity after 300 cycles was lower than the battery capacity in the first charging-discharging cycle by about 9%. It is considered that the reduction in the capacity retention rate was suppressed because the solid electrolyte interface film substantially free of a component derived from a flame retardant was formed on the surface of the positive-electrode active material or the negative-electrode active material by the pre-charging in the battery A. Although the non-aqueous electrolyte solution in the battery A contains a flame retardant, the battery A has cycle characteristics equal to the battery D.

The measurement result of the battery B according to the example 1 in FIG. 14 shows that the capacity retention rate was gradually reduced with the repeated charging-discharging cycles, and the battery capacity after 300 cycles was lower than the battery capacity in the first charging-discharging cycle by about 9.5%. It is considered that the reduction in the capacity retention rate was suppressed because the solid electrolyte interface film substantially free of a component derived from a flame retardant was formed on the surface of the positive-electrode active material or the negative-electrode active material by the pre-charging in the battery B. Although the non-aqueous electrolyte solution in the battery B contains a flame retardant, the battery B has cycle characteristics equal to the battery D.

The similar charging-discharging cycle test was performed to the produced battery E. The battery E has cycle characteristics equal to the battery B.

The flash point of the non-aqueous electrolyte solution extracted from each of the batteries A to D before the charging-discharging cycle test and the flash point of the non-aqueous electrolyte solution extracted from each of the batteries A to D after the charging-discharging cycle test were measured. The flash point was measured with Cleveland open cup method.

The Cleveland open cup method is prescribed in JIS K 2265-4. With this method, a sample is heated under a prescribed condition, and a small flame is put close to the sample. The lowest sample temperature at which the small flame causes the generated vapor to ignite is measured. In this way, a flash point can be obtained.

Table 1 illustrates the measurement results.

In the measurement result of the battery C according to the comparative example 1 in Table 1, the flash point after the test was 72° C. which was lower than the flash point before the test by about 20° C. The conceivable reason is such that the flame retardant concentration in the non-aqueous electrolyte solution is reduced due to the consumption of the flame retardant in the non-aqueous electrolyte solution by the charging-discharging cycle.

In the measurement result of the battery D according to the comparative example 2 in Table 1, the flash point was 35° C. before and after the test. This is considered to be the same as the flash point of the non-aqueous electrolyte solution free of flame retardant.

In the measurement result of the battery A according to the reference example 1 in Table 1, the flash point after the test was 96° C. which was higher than the flash point before the test by about 4° C. The conceivable reason is such that the consumption of the flame retardant in the non-aqueous electrolyte solution is suppressed due to a high quality of the solid electrolyte interface film formed on the surface of the positive-electrode active material or the negative-electrode active material, and the flame retardant concentration in the non-aqueous electrolyte solution is raised due to the consumption of the solvent contained in the non-aqueous electrolyte solution by the charging-discharging cycle.

In the measurement result of the battery B according to the example 1 in Table 1, the flash point after the test was 95° C. which was higher than the flash point before the test by about 3° C. The conceivable reason is such that the consumption of the flame retardant in the non-aqueous electrolyte solution is suppressed due to a high quality of the solid electrolyte interface film formed on the surface of the positive-electrode active material or the negative-electrode active material, and the flame retardant concentration in the non-aqueous electrolyte solution is raised due to the consumption of the solvent contained in the non-aqueous electrolyte solution by the charging-discharging cycle.

TABLE 1

|  | Battery A | Battery B | Battery C | Battery D |
|---|---|---|---|---|
| Flash point of electrolyte solution before test | 92° C. | 92° C. | 92° C. | 35° C. |
| Flash point of electrolyte solution after test | 96° C. | 95° C. | 72° C. | 35° C. |

Other Reference Embodiments

The non-aqueous electrolyte secondary battery according to the present embodiment comprises: an electrode body having a stacked structure in which a positive electrode containing a positive-electrode active material and a negative electrode containing a negative-electrode active material are stacked with a separator interposed therebetween; a non-aqueous electrolyte containing a flame retardant; and an outer casing accommodating the electrode body and the non-aqueous electrolyte, wherein the positive electrode or the negative electrode has a solid electrolyte interface film formed on the surface of the positive-electrode active material or the negative-electrode active material, and the solid electrolyte interface film has a portion composed of a component derived from a non-aqueous electrolyte substantially free of the flame retardant.

The non-aqueous electrolyte secondary battery according to the present embodiment comprises: an electrode body having a stacked structure in which a positive electrode containing a positive-electrode active material and a negative electrode containing a negative-electrode active material are stacked with a separator interposed therebetween; a non-aqueous electrolyte containing a flame retardant; and an outer casing accommodating the electrode body and the non-aqueous electrolyte. Therefore, the non-aqueous electrolyte secondary battery can move charges between the positive-electrode active material and the negative-electrode active material via the non-aqueous electrolyte, and therefore, the battery can be charged and discharged.

The non-aqueous electrolyte secondary battery according to the present embodiment comprises a non-aqueous electrolyte containing a flame retardant, and this can increase a flash point of the non-aqueous electrolyte and enhance safety of the battery.

According to the non-aqueous electrolyte secondary battery according to the present embodiment, the positive electrode or the negative electrode has a solid electrolyte interface film formed on the surface of the positive-electrode active material or the negative-electrode active material. With this configuration, the solid electrolyte interface film can be interposed between the non-aqueous electrolyte and the positive-electrode active material or the negative-electrode active material, whereby the movement of ions between the non-aqueous electrolyte and the positive-electrode active material or the negative-electrode active material can be stabilized.

According to the non-aqueous electrolyte secondary battery according to the present embodiment, the solid electrolyte interface film has a portion composed of a component derived from a non-aqueous electrolyte substantially free of the flame retardant. This configuration can prevent the reduction in battery capacity even if the charging-discharging cycle of the non-aqueous electrolyte secondary battery is repeatedly performed. Especially when the non-aqueous electrolyte is a non-aqueous electrolyte solution, a drop in a flash point of the non-aqueous electrolyte solution can be suppressed. This can enhance battery life characteristics, and further, can enhance safety of the battery. These effects have been demonstrated by experiments conducted by the present inventor.

Preferably, in the non-aqueous electrolyte secondary battery according to the present embodiment, the non-aqueous electrolyte contains ethylene carbonate.

This configuration can form an SEI (Solid Electrolyte Interface) that is a solid electrolyte interface film on the surface of the positive-electrode active material or on the surface of the negative-electrode active material with charging.

Preferably, in the non-aqueous electrolyte secondary battery according to the present embodiment, the flame retardant is a phosphazene compound.

This configuration can raise the flash point of the non-aqueous electrolyte solution by the flame retardant.

Preferably, in the non-aqueous electrolyte secondary battery according to the present embodiment, the negative-electrode active material is made of a carbon material such as graphite or hard carbon.

With this configuration, lithium ions can be extracted and/or inserted into the carbon material, and therefore, the non-aqueous electrolyte secondary battery can be charged and discharged. This configuration also enables the formation of the solid electrolyte interface film on the surface of the carbon material.

Preferably, in the non-aqueous electrolyte secondary battery according to the present embodiment, the positive electrode or the negative electrode includes a porous positive-electrode active material layer containing the positive-electrode active material or a porous negative-electrode active material layer containing the negative-electrode active material, wherein the non-aqueous electrolyte in the pores of the positive-electrode active material layer or the negative-electrode active material layer has a flame retardant concentration lower than that of the non-aqueous electrolyte between the electrode body and the outer casing.

With this configuration, the flame retardant in the non-aqueous electrolyte solution supplied to the positive-electrode active material layer or the negative-electrode active material layer is reduced. Therefore, this configuration can suppress the consumption of the flame retardant in the non-aqueous electrolyte solution caused by the electrochemical reaction in the positive-electrode active material or the negative-electrode active material due to the charging and discharging, thereby being capable of suppressing the reduction in the flash point of the non-aqueous electrolyte solution caused by the charging and discharging. Accordingly, safety of the non-aqueous electrolyte secondary battery can be enhanced.

Preferably, the non-aqueous electrolyte secondary battery according to the present embodiment further includes a shrink tube that bundles the electrode body.

With this configuration, the shape of the electrode body can be stabilized. This configuration can also prevent the flame retardant contained in the non-aqueous electrolyte solution outside of the shrink tube from being flown and diffused into the electrode body, thereby being capable of suppressing the consumption of the flame retardant with the electrochemical reaction in the electrode active material.

The present embodiment also provides a method for producing a non-aqueous electrolyte secondary battery comprising the steps of: charging the electrode body by applying a voltage between a positive electrode and a negative electrode with the state in which a surface of a positive-electrode active material included in the positive electrode and a surface of a negative-electrode active material included in the negative electrode are in contact with a non-aqueous electrolyte substantially free of the flame retardant; and placing a flame retardant and a non-aqueous electrolyte into an outer casing accommodating the positive electrode and the negative electrode.

The method for producing a non-aqueous electrolyte secondary battery according to the present embodiment includes the step of charging the electrode body by applying a voltage between a positive electrode and a negative electrode with the state in which a surface of a positive-electrode active material included in the positive electrode and a surface of a negative-electrode active material included in the negative electrode are in contact with a non-aqueous electrolyte substantially free of the flame retardant. With this, an SEI that is a solid electrolyte interface film composed of a component derived from a non-aqueous electrolyte substantially free of the flame retardant can be formed on the surface of the positive-electrode active material or the negative-electrode active material. Thus, life characteristics of the produced non-aqueous electrolyte secondary battery can be enhanced.

The method for producing a non-aqueous electrolyte secondary battery according to the present embodiment includes the step of placing a flame retardant and a non-aqueous electrolyte into an outer casing accommodating the positive electrode and the negative electrode. With this, the flash point of the non-aqueous electrolyte can be raised, and the safety of the produced non-aqueous electrolyte secondary battery can be enhanced.

Preferably, in the method for producing a non-aqueous electrolyte secondary battery according to the present embodiment, the step of performing charging is a step of performing charging in the outer casing.

With this, the production process can be simplified, and the production cost can be reduced.

Preferably, in the method for producing a non-aqueous electrolyte secondary battery according to the present embodiment, the step of performing charging is a step of performing charging in a container different from the outer casing.

With this, the quality of the solid electrolyte interface film formed on the surface of the positive-electrode active material or the negative-electrode active material can be enhanced, and life characteristics of the produced non-aqueous electrolyte secondary battery can be enhanced.

EXPLANATION OF NUMERALS

1: Battery case
2: Lid member
3: Positive-electrode current collector
4: Negative-electrode current collector
5: Non-aqueous electrolyte (non-aqueous electrolyte solution)
5a: Non-aqueous electrolyte solution containing flame retardant dissolved therein
5b: Non-aqueous electrolyte solution free of flame retardant
6a, 6b: Screw member
7: Current collector
8a, 8b: External connection terminal
10a, 10b: External insulating member
11a, 11b: Internal insulating member
12: Electrode body
13a, 13b: Packing
15: Shrink tube
17: Outer casing
20: Non-aqueous electrolyte (lithium ion) secondary battery 21: Positive electrode
22: Negative electrode
23: Electrode connection portion
24: Separator
25: Positive-electrode active material layer
26: Negative-electrode active material layer
27: Positive-electrode current collector sheet
28: Negative-electrode current collector sheet
29: Active material uncoated portion
31: Projection portion
32: Graphite particles
33: Negative-electrode active material
35: Solid electrolyte interface film (SEI)
37: Pretreatment container
40: First inlet
41: Second inlet
42: First sealing member
43: Second sealing member

What is claimed is:

1. A method for producing a non-aqueous electrolyte secondary battery, comprising the steps of:
   placing an electrode body into an outer casing, the electrode body having a folded-separator structure or a wound structure in which a positive electrode including a positive-electrode active material and a negative electrode including a negative-electrode active material are stacked with a separator interposed therebetween;
   placing a non-aqueous electrolyte free of a flame retardant into the outer casing;
   charging the electrode body by applying a voltage between the positive electrode and the negative electrode placed in the outer casing;
   placing a non-aqueous electrolyte containing a flame retardant dissolved therein into the outer casing; and
   sealing the outer casing, wherein
   the step of charging is a step of charging the electrode body with the state in which the surface of the positive-electrode active material and the surface of the negative-electrode active material are in contact with the non-aqueous electrolyte substantially free of the flame retardant; and
   further comprising a step of removing the non-aqueous electrolyte free of a flame retardant from the outer casing, wherein the step of placing the flame retardant is a step of placing the non-aqueous electrolyte containing the flame retardant dissolved therein into the outer casing after the non-aqueous electrolyte free of a flame retardant is removed.

2. The method for producing according to claim 1, further comprising a step of permeating the non-aqueous electrolyte free of a flame retardant into the positive electrode and the negative electrode placed in the outer casing, wherein the step of placing the flame retardant is a step of placing the flame retardant into the outer casing that houses the positive electrode and the negative electrode, into which the non-aqueous electrolyte free of a flame retardant has been permeated, and
   the step of charging is a step of charging the electrode body after the flame retardant is placed into the outer casing.

3. The method for producing according to claim 1, wherein the outer casing comprises a first inlet and a second inlet, wherein
   the first inlet is an opening for injecting the non-aqueous electrolyte free of a flame retardant into the outer casing, and is closed after the injection of the non-aqueous electrolyte, and
   the second inlet is an opening for injecting the non-aqueous electrolyte containing the flame retardant dissolved therein into the outer casing, and is closed after the injection of the non-aqueous electrolyte.

4. The method for producing according to claim 3, wherein the second inlet is formed to enable the injection of the non-aqueous electrolyte between the electrode body and the outer casing.

5. The method for producing according to claim 1, wherein the flame retardant is a phosphazene compound or a phosphoric ester compound.

6. The method for producing according to claim 1, wherein the non-aqueous electrolyte contains ethylene carbonate, vinylene carbonate, or fluoroethylene carbonate.

7. The method for producing according to claim 2, wherein the outer casing comprises a first inlet and a second inlet, wherein
   the first inlet is an opening for injecting the non-aqueous electrolyte free of a flame retardant into the outer casing, and is closed after the injection of the non-aqueous electrolyte, and
   the second inlet is an opening for injecting the non-aqueous electrolyte containing the flame retardant dissolved therein into the outer casing, and is closed after the injection of the non-aqueous electrolyte.

8. The method for producing according to claim 7, wherein the second inlet is formed to enable the injection of the non-aqueous electrolyte between the electrode body and the outer casing.

9. The method for producing according to claim 2, wherein the flame retardant is a phosphazene compound or a phosphoric ester compound.

10. The method for producing according to claim 3, wherein the flame retardant is a phosphazene compound or a phosphoric ester compound.

* * * * *